United States Patent
Yanagawa et al.

[19]
[11] Patent Number: 5,870,160
[45] Date of Patent: Feb. 9, 1999

[54] IN-PLANE FIELD TYPE LIQUID CRYSTAL DISPLAY DEVICE COMPRISING A STRUCTURE WHICH IS PREVENTED FROM CHARGING WITH ELECTRICITY

[75] Inventors: Kazuhiko Yanagawa; Masuyuki Ohta; Kazuhiro Ogawa; Keiichiro Ashizawa; Masahiro Yanai; Nobutake Konishi, all of Mobara; Kiyoshige Kinugawa, Mutsusawa-machi; Yasuyuki Mishima; Shigeru Matsuyama, both of Mobara, all of Japan

[73] Assignee: Hitachi, Ltd., Tokyo, Japan

[21] Appl. No.: 720,780

[22] Filed: Oct. 3, 1996

[30] Foreign Application Priority Data

Oct. 12, 1995 [JP] Japan .................................... 7-264443
Mar. 19, 1996 [JP] Japan .................................... 8-062459

[51] Int. Cl.$^6$ ........................ G02F 1/1343; G02F 1/1333; G02F 1/1335
[52] U.S. Cl. ........................ 349/141; 349/110; 349/111; 349/59; 349/96
[58] Field of Search ............................. 349/110, 59, 111, 349/96, 141

[56] References Cited

U.S. PATENT DOCUMENTS

| | | | |
|---|---|---|---|
| 4,247,930 | 1/1981 | Martin | 349/96 |
| 4,345,000 | 8/1982 | Kawazoe et al. | 428/212 |
| 4,719,152 | 1/1988 | Ohta et al. | 428/432 |
| 5,333,073 | 7/1994 | Suzuki | 359/50 |
| 5,492,762 | 2/1996 | Hirau et al. | 428/447 |
| 5,521,728 | 5/1996 | Kodate et al. | 359/59 |
| 5,527,649 | 6/1996 | Sato et al. | 430/7 |
| 5,598,285 | 1/1997 | Kondo et al. | 349/42 |
| 5,619,222 | 4/1997 | So | 345/87 |
| 5,666,177 | 9/1997 | Hsieh et al. | 349/111 |
| 5,667,921 | 9/1997 | Takayanagi et al. | 430/7 |
| 5,677,745 | 10/1997 | Kawano et al. | 349/42 |

FOREIGN PATENT DOCUMENTS 06250451 5/1996 Japan ........................................ 349/61

*Primary Examiner*—William L. Sikes
*Assistant Examiner*—Tarifur R. Chowdhury
*Attorney, Agent, or Firm*—Antonelli, Terry, Stout & Kraus, LLP

[57] ABSTRACT

Even when a high potential such as of static electricity is applied from the outside of the liquid crystal display panel, the display image is prevented from becoming abnormal. When a black matrix of a resin composition having a large resistivity is used, the positions of the polarizer plates, black matrix, sealing portion and open region of the housing are defined to prevent the light from leaking through the periphery of the effective pixel region. The leakage of backlight that cannot be prevented by the black matrix only is prevented by the polarizer plates and the housing, a transparent electrically conductive film having a sheet resistivity of not larger than $2\times10^{14}$ Ω/□ is formed over, under, or inside the polarizer plate, and the electrically conductive film is electrically connected to the electrically conductive housing.

64 Claims, 20 Drawing Sheets

IN-PLANE FIELD TYPE LIQUID CRYSTAL DISPLAY DEVICE COMPRISING A STRUCTURE WHICH IS PREVENTED FROM CHARGING WITH ELECTRICITY

BACKGROUND OF THE INVENTION

The present invention relates to an in-plane field type liquid crystal display device. More specifically, the invention relates to an in-plane field type liquid crystal display device having a structure which is prevented from being charged with electricity, and which is adapted to use of a black matrix having a high resistivity.

The conventional liquid crystal display devices can be divided into a "vertical field type" and an "in-plane field type" from the standpoint of the mode employed for driving the liquid crystals.

The vertical field type liquid crystal display device is one in which a pixel electrode and a common electrode made of transparent conductive material are provided facing each other in a unit pixel, and the light passing through the liquid crystal layer is modulated by an electric field generated across the pixel electrode and the common electrode perpendicularly to the transparent substrates.

On the other hand, the in-plane field type liquid crystal display device is the one in which at least a pair of electrode including a pixel electrode and a counter electrode are provided in a unit pixel on one or both of the transparent substrates, and the light passing through the liquid crystal layer is modulated by a field component generated between the pixel electrode and the counter electrode nearly in parallel with the surfaces of the liquid crystal layer.

Unlike the vertical field type liquid crystal display device, the in-plane field type liquid crystal display device enables the viewer to view a sharp image even when viewed at a large tilt angle, and thus features excellent wide viewing angle characteristics.

Liquid crystal display devices having such a constitution have been described in detail in, for example, Japanese Patent Application No. 505247/1993, Japanese Patent Publication No. 21907/1988 and Japanese Patent Laid-Open No. 160878/1994.

FIG. 7 illustrates a conventional liquid crystal display device in which a metal film, such as a film of chromium having an excellent light-shielding property, is used as a black matrix. The outer circumference of the black matrix BM is set to be sufficiently larger in a plan view than the effective pixel region AR and to be larger than the open region WD of the housing MD, making it possible to sufficiently intercept the backlight in the region where the black matrix is formed.

Therefore, the polarizer plates POL1 and POL2 can be designed to be smaller than the open region WD of the housing MD. This makes it possible to regenerate the polarizer plates, to prevent the polarizer plate POL2 from coming into contact with the housing MD in the step of assembling the module, and to prevent the polarizer plates from getting scratched.

SUMMARY OF THE INVENTION

In the liquid crystal display devices of the above-mentioned conventional structures, however, no attention has been given to either the leakage of backlight that occurs from the ends of the image display region up to the housing when a black matrix having a high resistivity is used or to the charging with electricity due to static electricity that is intrinsic to the in-plane field type liquid crystal display device.

That is, when a metal film, such as a film of chromium Cr or the like, is used as the black matrix BM in the in-plane field type liquid crystal display device as shown in FIG. 8, the electric field formed between a pixel electrode PX and a counter electrode CT is distorted and the parallel component is weakened.

In the in-plane field type liquid crystal display device, therefore, it is necessary to use a black matrix BM of, for example, a resin composition having a high resistivity.

Generally speaking, however, the black matrix BM of a high resistivity, e.g., a resin black matrix BM, has a low light-shielding property compared with that of a metal film.

The light-shielding property improves with an increase in the thickness of the resin film. However, variation in the thickness of the black matrix increases, making it difficult to maintain thickness uniformity of a liquid crystal layer.

Therefore, a limitation is imposed on increasing the thickness of the resin film.

Moreover, no electric field for displaying an image is applied to the regions, from the ends of the image display region to the housing and, hence, behavior of the liquid crystal molecules cannot be controlled in these regions.

When a resin black matrix with low light-shielding property is used and a liquid crystal display panel PNL displays a dark image, for example, there arises a problem of leakage of light from the regions.

Moreover, the liquid crystals are sealed according to a procedure including 1) the interior of the sealing device is evacuated to evacuate the space between the two substrates secured with a sealing material, 2) the sealing port is dipped into the liquid crystals, 3) the vacuum state in the sealing device is returned back to the atmospheric pressure, and 4) the liquid crystals are sealed by utilizing the pressure differential between the space and the sealing device.

With this procedure, the substrate undergoes deformation since the pressure differential occurs when a liquid crystals are being sealed in. A force at this moment acts upon the adhesion surfaces between the substrates and the sealing material fastening the two substrates. When the resin black matrix is overlapped on the surfaces of the sealing material, therefore, peeling occurs between the resin black matrix and the glass substrate or between the resin black matrix and the overcoat film due to the structure of the color filter.

When the outer circumference of the black matrix BM formed over the effective display region AR is set to be smaller than the open region WD of the housing MD in a plan view, there arises a problem that backlight leaks to a large extent that can be perceived by the viewer on the outer side of the circumference of the black matrix BM.

Besides, in the liquid crystal display device of the so-called normally black mode, where a dark image is displayed when the thin-film transistors are in a turned-off state, the above-mentioned leakage of light around the circumference becomes recognizable since the display screen is black for extended periods of time.

Furthermore, in the in-plane field type liquid crystal display device having no wiring patterns of electrically conductive film on the top substrate SUB2 side, a large amount of charge that has infiltrated onto the top substrate SUB2 surface from the external side affects the electric field even inside the liquid crystal layer, making it difficult to display an image as desired.

For example, simply rubbing the surface of the panel causes the screen to become whitish.

Moreover, if the outer circumference of the black matrix BM is set to be larger than the effective display region, the seal-forming region is shifted outward, whereby the size of the substrates increases, and the edge regions of the liquid crystal display device increase.

In order to solve the above-mentioned problems, the present invention takes chiefly the following approach. That is, a liquid crystal display device comprising a switching element, a pixel electrode is and a counter electrode formed in a unit pixel over a first substrate of two substrates which are so disposed as to be opposed to each with a liquid crystal layer provided there between and at least one of the two substrates is transparent, and the light that passes through the liquid crystal layer is modulated with an electric field generated between the pixel electrode and the counter electrode substantially in parallel with the first substrate;

wherein a black matrix having a resistivity of not smaller than $10^6$ Ω·cm is formed between the first substrate and the second substrate, and an electrically conductive layer having a light-transmitting property is formed over the surface of the transparent substrate opposite to the liquid crystal layer at the viewed side, and is formed over a pixel-forming region.

According to the above-mentioned arrangement, an electrically conductive layer having light-transmitting property is formed over at least the pixel-forming region, i.e., formed over the display region so that this electrically conductive layer exhibits a shielding function against static electricity from the external side.

Here, since the electrically conductive layer is formed over the surface on the substrate of the side thereof opposite to the liquid crystal side, the electric field from the pixel electrode terminates not on the electrically conductive layer entirely but on the counter electrode, and so the electrically conductive layer does not adversely affect the quality of display. This is because the thickness of the liquid crystal layer and the distance between the pixel electrode and the counter electrode are from several microns to several tens of microns, whereas the thickness of each of the transparent substrates is about one millimeter, the difference therebetween being of the order of hundreds to thousands of times.

Even when a high potential such as produced by static electricity is applied from the outside of the liquid crystal display panel, therefore, the display is prevented from becoming abnormal.

The following description will be discussed to what extent the electrically conductive film should possess a light-transmitting property and an electrical conductivity.

For example, the electrically conductive layer can be formed by dispersing electrically conductive fine particles of carbon in a sticky layer that is interposed between a polarizer plate stuck to the substrate of the viewed side and the substrate.

The display characteristics of liquid crystal display devices are usually compared with those of cathode-ray tubes, and their greatest feature is their very small power consumption.

Therefore, the light-transmitting property of the liquid crystal display panel PNL inclusive of the light-transmitting property of the conductive sticking layer is determined by taking the power consumption into consideration.

Assume a target of fabricating a liquid crystal display panel of a size of 13.3 inches having a surface brightness of 200 Cd/m$^2$.

The display region of the liquid crystal display panel having a diagonal of 13.3 inches is nearly comparable to the display region of the cathode-ray tube having a diagonal of 15 inches. The power consumption of the backlight unit is, for example, 34 watts at 5000 Cd/m$^2$.

Here, assuming that the surface brightness varies roughly in proportion to the consumption of electric power, then, there is a relation 147 Cd/m$^2$/watt.

Letting the light-transmission factor of the in-plane field type liquid crystal display panel be T(%) and the light-transmission factor of the sticky layer in which are mixed electrically conductive fine particles be P(%), then the following formula holds,

[Eq. 1]

$$\text{Power consumption (watts)} = \frac{200 \ (Cd/m_2)}{147 \left( \frac{Cd/m_2}{\text{watt}} \right) \times \left( \frac{T}{100} \right) \times \left( \frac{P}{100} \right)} \quad (1)$$

In this formula (1), T is about 4%. The average power consumption of a 15-inch cathode-ray tube is 100 watts. When the power consumption is set to be 100 watts, therefore, P becomes not smaller than 34%.

Therefore, when the sticky layer in which are mixed fine electrically conductive particles has a light-transmission factor not smaller than 34%, then, the liquid crystal display device maintains its advantage of small power consumption.

As for the electrical conductivity of the sticky layer in which are mixed fine electrically conductive particles, it is preferable that the sheet resistivity is not larger than $2 \times 10^{14}$ Ω/□ in order to obtain charge-preventing effect to a sufficient extent.

According to this example, the electrically conductive layer having a light-transmitting property formed over the display region of the liquid crystal display panel exhibits a shielding function against static electricity from the external side.

The foregoing and other objects, advantages, manner of operation and novel features of the present invention will be understood from the following detailed description when read in connection with the accompanying drawings.

DESCRIPTION OF THE PREFERRED EMBODIMENT

Figure 1:
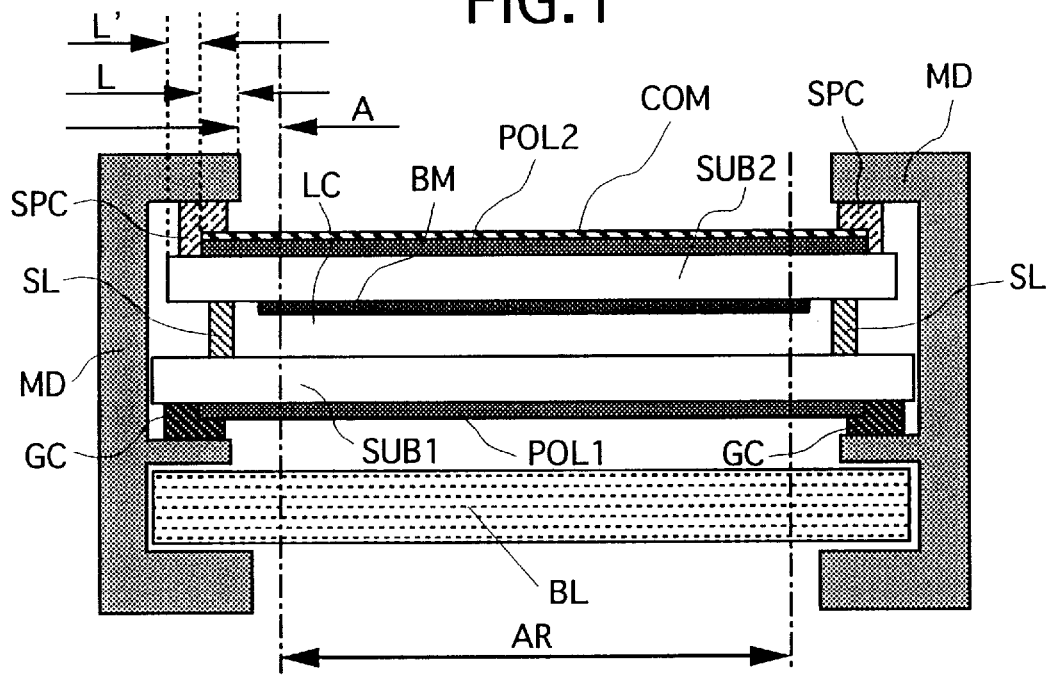
FIG. 1 is a sectional view illustrating, on an enlarged scale, essential portions of the periphery of an open region of a housing of a first example.

Embodiment of the present invention will now be described with reference to the drawings.

Other objects and other features of the present invention will become obvious from the following description with reference to the drawings.

<<Active Matrix Liquid Crystal Display Device>>

Described below is an embodiment in which the present invention is applied to a color liquid crystal display device of the active matrix type. In those drawings, the portions having the same functions are denoted by the same reference numerals but are not described repeatedly.

<<Plane Constitution of a Matrix Portion (Pixel Forming Region)>>

Figure 10:
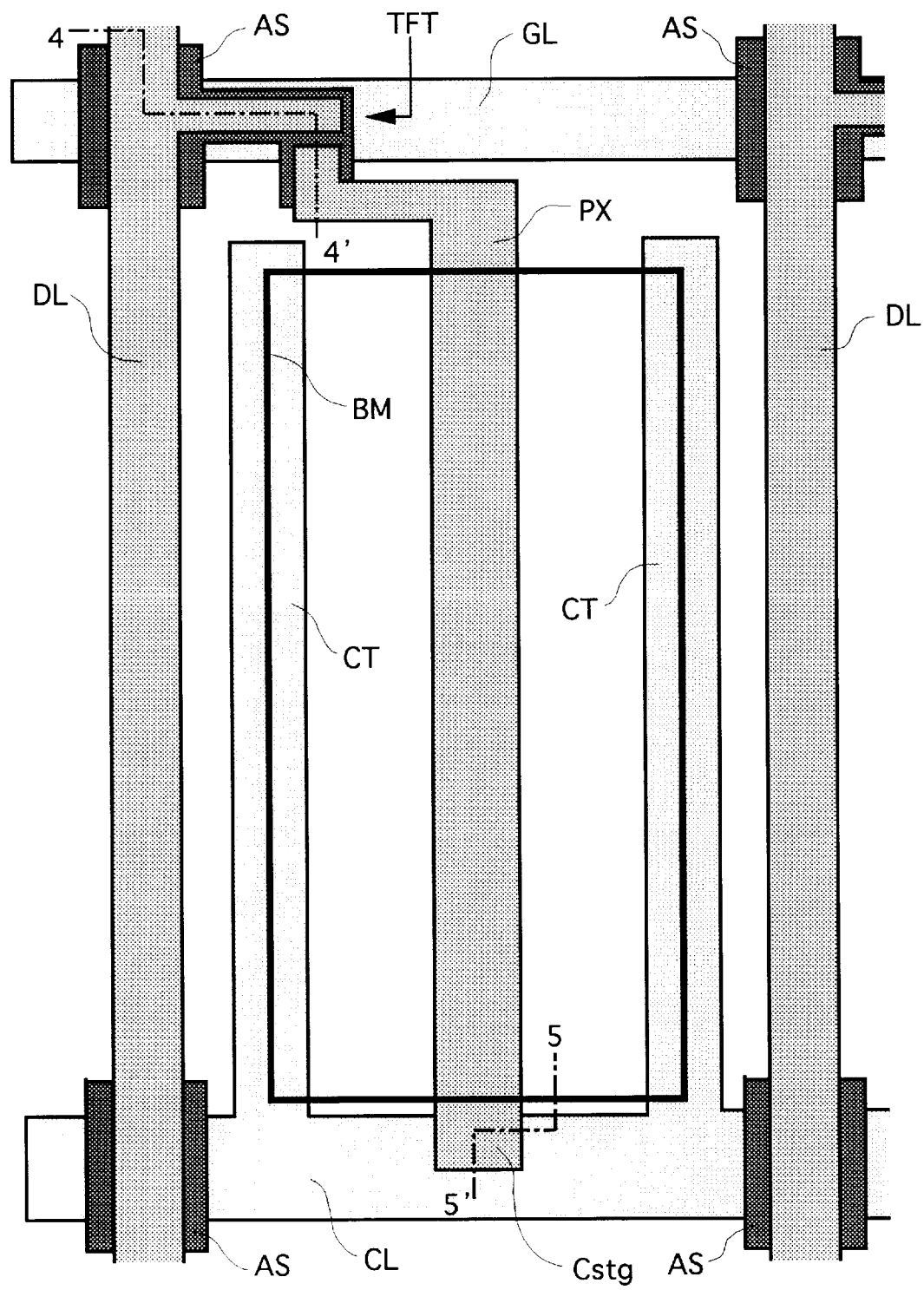
FIG. 10 is a plan view illustrating a unit pixel and its periphery of an active matrix-type color liquid crystal display device according to the present invention.

FIG. 10 is a plan view illustrating a pixel in the active matrix-type color liquid crystal display device of the present invention, light-shielding regions of a black matrix BM and the peripheries thereof.

As shown in FIG. 10, a pixel is disposed in a region where a scanning signal line (gate signal line or horizontal signal line) GL, a counter voltage signal line (counter electrode wiring) CL, and two adjacent video signal lines (drain signal lines or vertical signal lines) DL intersect each other (to form a region surrounded by four signal lines.

Each pixel includes, at least, a thin-film transistor TFT, a storage capacitor Cstg, a pixel electrode PX and a counter electrode CT.

The scanning signal lines GL and the counter voltage signal lines CL extend toward the right and left in the drawing and are arranged in a plural number in the vertical direction. The video signal lines DL extend in the vertical direction and are arranged in a plural number in the right-and-left direction.

The pixel electrode PX is connected to the thin-film transistor TFT, and the counter electrodes CT are formed integrally with the counter voltage signal line CL.

The pixel electrode PX and the counter electrode CT are adjacent each other, and the orientation of the liquid crystal molecules LC is controlled by the electric field between the pixel electrode PX and the counter electrode CT, and the transmitted light is modulated to control the display.

The line-like or stripe-like pixel electrodes PX and the counter electrodes CT are constituted in the form of comb teeth, and extend in the vertical direction.

The number O of counter electrodes (number of comb teeth) in each pixel necessarily maintains a relationship O=P+1 with respect to the number P of pixel electrodes PX (number of comb teeth) (O=2 and P=1 in this embodiment).

This is to alternatingly arrange the counter electrodes CT and the pixel electrodes PX and to necessarily bring the counter electrodes CT adjacent to the video signal lines DL.

Thus, the counter electrode CT blocks the lines of electric force from the video signal line DL, so that the electric field between the counter electrode CT and the pixel electrode PX is not affected by the electric field generated from the video signal line DL.

The counter electrode CT has a stable potential since it is always fed with a potential from an external unit through the counter voltage signal line CL.

Therefore, its potential fluctuates very little even though the counter electrode CT is adjacent to the video signal line DL.

Besides, since the geometrical position of the pixel electrode PX is spaced from the video signal line DL, the parasitic capacitance decreases greatly between the pixel electrode PX and the video signal line DL, making it possible to suppress variation in the pixel electrode potential Vs caused by the video signal voltage. This makes it possible to suppress crosstalk (a defect in the picture called vertical smear) that occurs in the vertical direction.

The pixel electrode PX and the counter electrode CT have widths Wp and Wc which are 6 $\mu$m, respectively, and are sufficiently larger than a maximum thickness 4.5 $\mu$m of the liquid crystal layer that will be described later.

It is desirable that a margin of not smaller than 20% is maintained by taking variation in the products into consideration. Desirably, therefore, the electrode widths are much larger than 5.4 $\mu$m.

Accordingly, the field component that is applied to the liquid crystal layer in parallel with the substrate surface becomes larger than the field component in the direction perpendicular to the substrate surface, making it possible to suppress a rise in the voltage for driving the liquid crystals.

It is further desirable that the maximum widths Wp and Wc of the electrodes are smaller than the gap L between the pixel electrode PX and the counter electrode CT.

This is because, when the gap between the electrodes becomes too small, the lines of electric force are curved so excessively that the region increases where the field component perpendicular to the substrate surface is larger than the field component in parallel with the substrate surface, making it difficult to efficiently apply the field component which is in parallel with the substrate surface to the liquid crystal layer.

To maintain a margin of 20%, therefore, the gap L between the pixel electrode PX, and the counter electrode CT must be larger than 7.2 $\mu$m.

In this embodiment, a display is constituted having a diagonal of about 5.7 inches and a resolution of 640×480 dots, and, hence, the pitch between the pixels is about 60 mm. The gap L>7.2 $\mu$m is realized by dividing the pixel into two.

In order to prevent breakage, furthermore, the video signal line DL has a width of 8 $\mu$m which is slightly broader than that of the pixel electrode PX or the counter electrode CT.

In order to prevent a short circuit, a gap of about 1 $\mu$m is maintained between the video signal line DL and the counter electrode CT, and the video signal line DL is formed on the upper side of the gate-insulating film GI and the counter electrode CT is formed on the lower side thereof so that they lie in different layers.

On the other hand, the gap between the pixel electrode PX and the counter electrode CT is changed depending upon the liquid crystal material.

This is because, since the field intensity for accomplishing a maximum transmission factor varies depending upon the liquid crystal material, the gap between the electrodes is determined depending upon the liquid crystal material, and a maximum transmission factor is obtained within a range of a maximum amplitude of a signal voltage that is determined depending upon the withstand voltage of the video signal driver circuit (driver of the signal side). When a liquid crystal material that will be mentioned later is used, the gap between the electrodes becomes about 15 $\mu$m.

In this embodiment, the black matrix BM is formed over the gate wiring GL, the thin-film transistor TFT, the drain wiring DL, and the region between the drain wiring DL and the counter electrode CT.

<<Cross-Sectional Constitution of the Matrix Portion (Pixel Forming Region)>>

Figure 11:
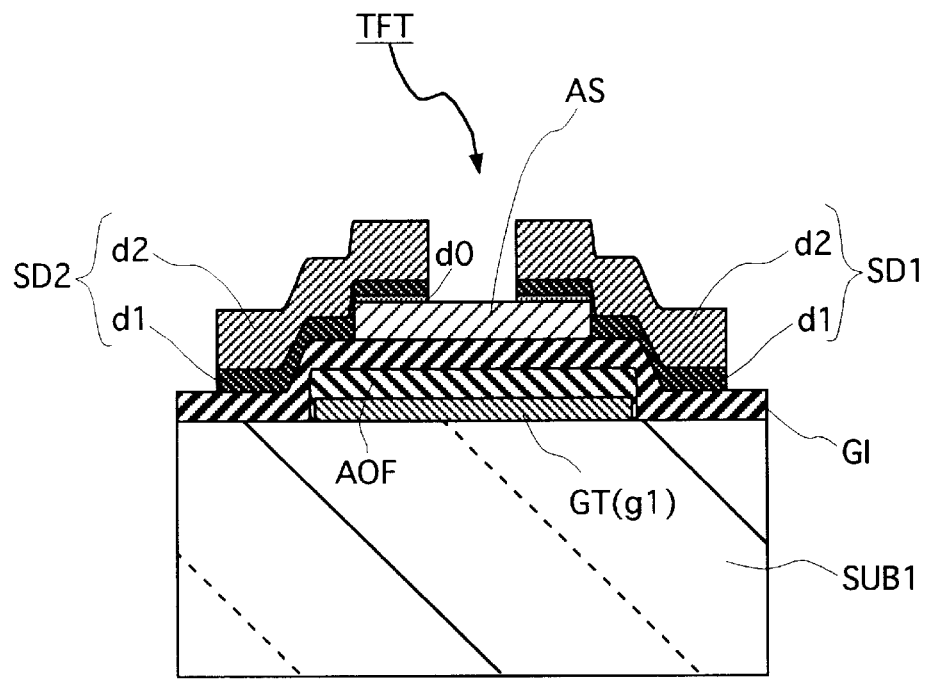
FIG. 11 is a sectional view of a thin-film transistor element TFT cut along the line 4-4' in FIG. 10.
Figure 12:
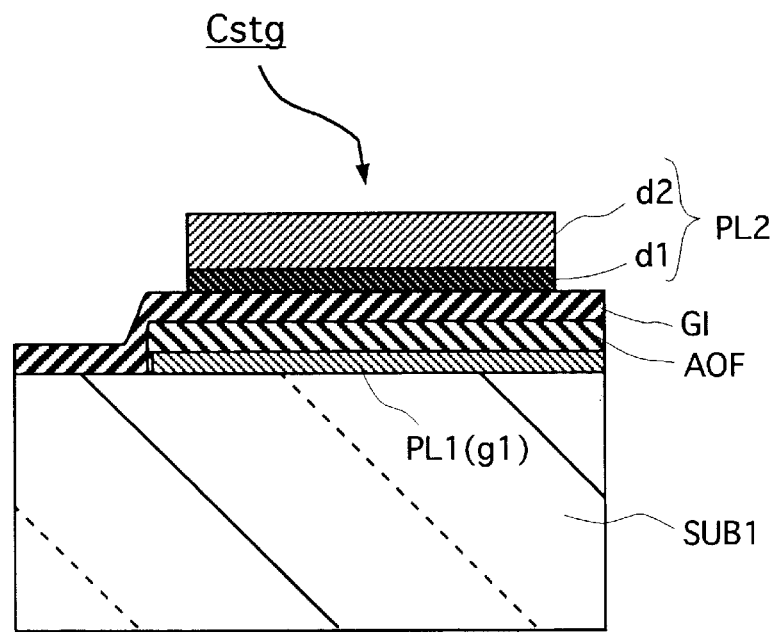
FIG. 12 is a sectional view of a storage capacitor Cstg cut along the line 5-5' in FIG. 10.
Figure 16:
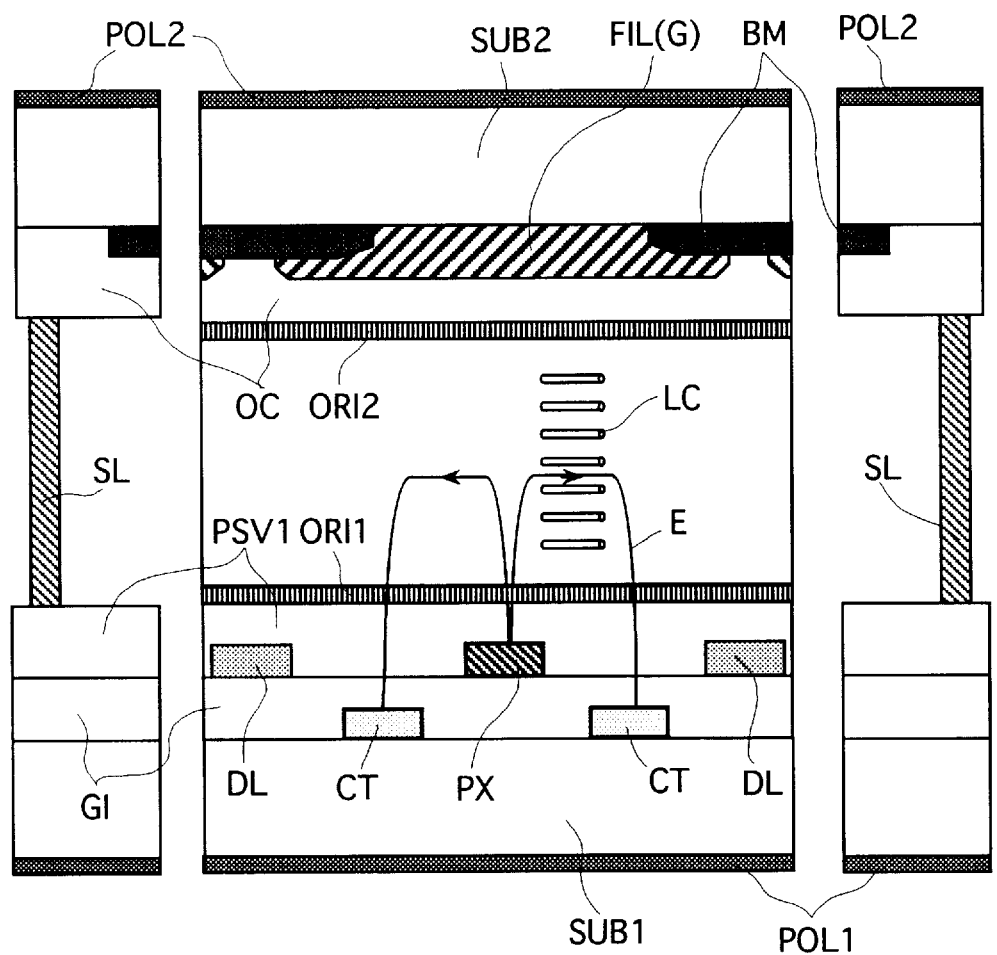
FIG. 16 is a sectional view of a pixel in an image display region and its periphery of the in-plane field type liquid crystal display panel.

FIG. 11 is a sectional view of the thin-film transistor TFT cut along the line 4–4' in FIG. 10, FIG. 12 is a diagram illustrating in cross section the storage capacitor Cstg cut along the line 5–5' in FIG. 10, and FIG. 16 is a sectional view of a pixel in an image display region and its periphery in an in-plane field type liquid crystal display panel.

Referring to FIG. 16, the thin-film transistors TFT, storage capacitors Cstg (not shown) and electrode groups CT, PX are formed on the lower transparent glass substrate SUB1 side, and a color filter FIL and a black matrix pattern BM for shielding light are formed on the upper transparent glass substrate SUB2 side.

Though not yet widely known, it is also possible to form a black matrix pattern BM for shielding light on the lower transparent glass substrate SUB1 side, as disclosed in Japanese Patent Application No. 198349/1995 filed by the present applicant.

Furthermore, orientation films ORI1 and ORI2 for controlling the initial orientation of liquid crystals are formed on the inner surfaces (on the liquid crystals LC side) of the transparent glass substrates SUB1 and SUB2. On the outer surfaces of the transparent glass substrates SUB1 and SUB2 are provided polarizer plates POL1 and POL2 of which the axes of polarization are arranged at right angles to each other (cross-Nicol arrangement).

<<TFT Substrate>>

First, the constitution of the lower transparent glass substrate SUB1 (TFT substrate) will be described below in detail.

<<Thin-Film Transistor TFT>>

The thin-film transistor TFT so operates that the channel resistance between the source and the drain decreases when a positive bias is applied to the gate electrode GT and the channel resistance increases when no bias is applied.

As shown in FIG. 11, the thin-film transistor TFT has a gate electrode GT, a gate insulating film GI, an i-type (intrinsic, not doped with impurities that determine conductivity type) semiconductor layer AS of amorphous silicon (Si), and a pair of source electrode SD1 and drain electrode SD2.

The source and drain are determined depending upon the polarity of bias applied across them. In the circuit of this liquid crystal display device, the polarity is inverted during the operation. It should therefore be noted that the source and drain are changed with each other during the operation.

In the following description, however, either of them is expressed as source and the other is expressed as drain in a fixed manner for convenience of explanation.

<<Storage Capacitor Cstg>>

The pixel electrode PX is so formed as to be overlapped on the counter voltage signal line CL at the end of the side opposite to the end where it is connected to the thin-film transistor TFT. As will be obvious from FIG. 12, this overlap constitutes the storage capacitor (capacitance element) Cstg having the pixel electrode PX as one electrode PL2 and the counter voltage signal line CL as the other electrode PL1. The dielectric film of the storage capacitor Cstg is comprised of an insulating film GI used as a gate-insulating film of the thin-film transistor TFT and an anodic oxide film AOF.

Referring to FIG. 10, the storage capacitor Cstg is formed on a portion of the electrically conductive film g1 of the counter voltage signal line CL on a plane.

The storage capacitor Cstg has an electrode made of aluminum Al that is located under the insulating film GI and has its surface anodically treated. This prevents the occurrence of point defect (shortcircuit to the electrode located on the upper side) caused by so-called whiskers of aluminum Al.

<<Color Filter Substrate>>

Referring to FIGS. 10 and 16, constitution of the upper transparent glass substrate SUB2 (color filter substrate) will be described in detail.

<<Light-Shielding Film BM>>

A light-shielding film BM (so-called black matrix) is formed on the upper transparent glass substrate SUB2, so that light transmitted through undesired gaps (gaps other than the gap between the pixel electrode PX and the counter electrode CT) does not go to the display surface to deteriorate the contrast.

The light-shielding film BM further has a function that external light and backlight do not fall on the i-type semiconductor layer AS. That is, the i-type semiconductor layer AS of the thin-film transistor TFT is sandwiched by the upper and lower light-shielding films BM and by the gate electrode GT having a slightly large size, and does not receive external natural light or backlight.

FIG. 10 shows a closed polygonal contour of the light-shielding film BM. The inside of the contour is an opening where no light-shielding film BM is formed. The pattern of the contour is only an example.

In the in-plane field type liquid crystal display device, it is desirable to use a black matrix having a resistivity which is as large as possible and, hence, a resin composition is usually used. Though the standards for the resistivity have not been established, Japanese Patent Application No. 191994/1995 filed by the same applicant discloses some of them.

That is, if the N-th power of ten is expressed as $10^N$, the liquid crystal composition LC should have a resistivity of not smaller than $10^N$ Ω·cm and if the M-th power of ten is expressed as $10^M$, the black matrix BM should have a resistivity of not smaller than $10^M$ Ω·cm yet satisfying a relationship N>9, M>6, or satisfying a relationship N>13, M>7.

It is desirable to use a black matrix of a resin composition even from the standpoint of decreasing the surface reflection of the liquid crystal display device.

Compared with the case where a metal film such as of Cr is used as the black matrix, furthermore, no step is required for etching the metal film, and the production of the color filter substrate can be simplified.

When a metal film is used, the production process includes 1) a step of forming the metal film, 2) a step of applying a resist, 3) a step of exposure to light, 4) a step of developing, 5) a step of etching the metal film, and 6) a step of peeling the resist. When a resin is used, the production process includes 1) a step of applying a resin, 2) a step of exposure to light and 3) a step of developing, resulting in a marked reduction in the number of steps.

Compared with the metal film, however, the resin composition has a low light-shielding property. When the thickness of the resin film is increased, the light-shielding property is improved resulting, however, in an increase in the variation of the thickness of the black matrix. If the variation in the film thickness is, for example, ±10%, the variation is ±0.1 μm when the black matrix has a thickness of 1.0 μm and the variation is ±0.2 μm when the black matrix has a thickness of 2 μm.

When the thickness of the black matrix is increased, furthermore, variation in the thickness of the color filter substrate increases, too, making it difficult to improve the uniformity of the thickness of the liquid crystal layer. For these reasons, it is desirable for the resin film to have a thickness of not larger than 2 μm.

To accomplish the OD value of not smaller than about 4.0 with a film thickness of 1 mm by blackening the black matrix by, for example, increasing the carbon content, the specific resistance of the black matrix BM becomes smaller than about $10^6$ Ω·cm, which is not suitable. The OD value is defined to be a value obtained by multiplying the absorption coefficient of light by the film thickness.

In this embodiment, the light-shielding film BM is composed of a resin composition obtained by mixing a black inorganic pigment into a resist material, and has a thickness of about 1.3±0.1 μm. Examples of the inorganic pigment include palladium, electroless plating nickel, etc. Furthermore, the black matrix BM has a specific resistance of about $10^9$ Ω·cm and an OD value of about 2.0.

Described below is the result of calculation of the ratio of transmitted light Y of when a black matrix BM of resin composition is used.

[Eq. 2]

OD value=log (100/Y)

$Y = \int A(\lambda) \cdot B(\lambda) \cdot C(\lambda) d\lambda / \int A(\lambda) \cdot C(\lambda) d\lambda$ where A is the visual sensitivity, B is the transmission factor, C is the spectrum of light source, and λ is the wavelength of incident light.

When the light is blocked by a film having an OD value of 2.0, Y=1% is obtained from the above formula.

Therefore, assuming that the incident light has an intensity of 4000 cd/m², light of about 40 cd/m² is transmitted through, and the light of this intensity is bright enough for a person to recognize.

The light shielding film BM is formed like a picture frame even along the peripheral portions and is continuous to the pattern of the matrix portion having a plurality of dot-like openings as shown in FIG. 10.

One of the objects of the present invention is to determine the position of the outer peripheral portion of the light-shielding film BM in relation to the sealing portion SL, polarizer plates POL, and open region WD of the module housing MD.

<<Color Filters FIL>>

The color filters FIL are formed like stripes at positions corresponding to the pixels in a repetition of red, green and blue colors. The color filters FIL are so formed as to be overlapped on the edge portions of the light-shielding film BM.

The color filters FIL are formed in a manner as described below. First, a dye base such as of acrylic resin is formed on the surface of the upper transparent glass substrate SUB2, and is removed except the region for forming a red filter by a photolithography technique.

Thereafter, the dye base is dyed with a red dye, and is subjected to the fixing processing to form a red filter R. By repeating a similar steps, a green filter G and a blue filter B are formed successively.

<<Overcoat Film OC>>

The overcoat film OC is formed for preventing the dyes of the color filters FIL from leaking into the liquid crystals LC and for flattening the step produced by the color filters FIL and the light-shielding film BM. The overcoat film OC is formed of a transparent resin material such as acrylic resin, epoxy resin or the like resin.

<<Liquid Crystal Layer and Polarizer Plates>>

Next, the liquid crystal layer, orientation films and polarizer plates will be described.

<<Liquid Crystal Layer>>

As the liquid crystal material LC, use is made of a nematic liquid crystal having a positive dielectric constant anisotropy Δε of 13.2 and having a refractive index anisotropy Δn of 0.081 (589 nm, 20° C.), or nematic liquid crystal having a negative dielectric constant anisotropy Δε of −7.3 and having a refractive index anisotropy Δn of 0.053 (589 nm, 20° C).

The liquid crystal layer has a thickness (gap) of not smaller than 2.8 μm but not larger than 4.5 μm when the dielectric constant anisotropy Δε is positive.

This is because when the retardation Δn ·d is larger than 0.25 μm but is smaller than 0.32 μm, there are obtained transmission factor characteristics that are very little dependent upon wavelength within a range of visible light, and most of the liquid crystals having a positive dielectric constant anisotropy Δε exhibit a double refraction anisotropy An of larger than 0.07 but smaller than 0.09.

When the dielectric constant anisotropy Δε is negative, on the other hand, the liquid crystal layer has a thickness (gap) of larger than 4.2 μm but smaller than 8.0 μm.

This is because, like in the case of the liquid crystals having a positive dielectric constant anisotropy Δε, it is necessary to suppress the retardation Δn ·d to be larger than 0.25 μm but smaller than 0.32 μm.

In this case, most of the liquid crystals having a negative dielectric constant anisotropy Δε exhibit a double refraction anisotropy An which is larger than 0.04 but is smaller than 0.06.

By combining the orientation films that will be described later with the polarizer plates, furthermore, a maximum transmission factor can be obtained when the liquid crystal molecules are twisted by 45° to the direction of electric field from the rubbing direction.

The thickness (gap) of the liquid crystal layer is controlled by polymer beads.

There is no particular limitation on the liquid crystals LC as long as they are nematic liquid crystals. The drive voltage can be decreased with an increase in the value of the dielectric constant anisotropy $\Delta\epsilon$.

Moreover, the thickness (gap) of the liquid crystal layer can be increased with a decrease in the refractive index anisotropy $\Delta n$, making it possible to shorten the time required to seal the liquid crystals and to decrease variation in the gap.

<<Orientation Films>>

A polyimide is used for the orientation films ORI1 and ORI2. The rubbing direction RDR is in parallel between the upper substrate and the lower substrate, and defines an initial orientation angle $\Phi lc$ of 75° with respect to the direction EDR of applied electric field as shown in FIG. 9.

The initial orientation angle $\Phi lc$ should be not smaller than 45 degrees but smaller than 90 degrees when the liquid crystals have a positive dielectric constant anisotropy $\Delta\epsilon$, and should be larger than 0 degree but smaller than 45 degrees when the liquid crystal materials have a negative dielectric constant anisotropy $\Delta\epsilon$.

<<Polarizer Plates>>

Figure 9:
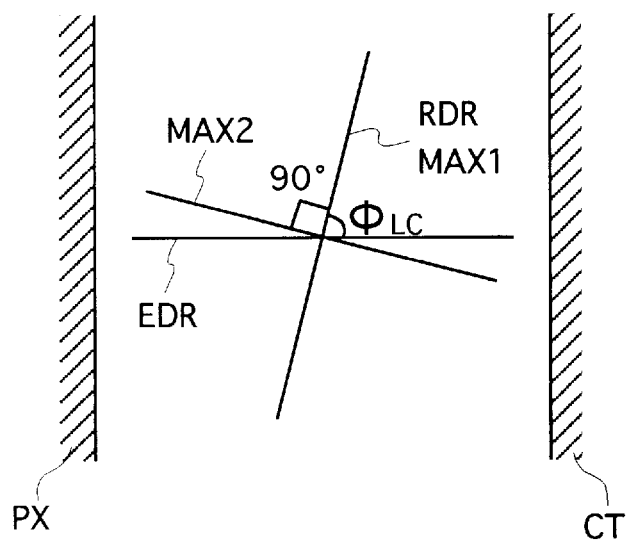
FIG. 9 is a diagram illustrating a relationship among the direction of applied electric field, the rubbing direction and the axes of light transmission of top and bottom polarizer plates.

The polarizer plates POL are those (G1220DU) manufactured by Nitto Denkosha Co., and the axis MAX1 of polarized light transmission of the lower polarization plate POL1 is aligned with the rubbing direction RDR, and the axis MAX2 of polarized transmission of the upper polarization plate POL2 intersects at right angles thereto, as shown in FIG. 9.

This makes it possible to obtain a normally black mode in which the transmission factor rises with an increase in the voltage (voltage across the pixel electrode PX and the counter electrode CT) applied to the pixels.

<<Electrically Conductive Layer>>

In the embodiment of the invention, abnormal display occurs when a high potential such as of static electricity is applied from the external side to the surface of the upper substrate SUB2.

Therefore, a transparent electrically conductive film having a sheet resistivity of not larger than $2 \times 10^{14}$ $\Omega/\square$ is formed inside the upper polarizer plate POL2, on the upper side, or on the lower side of the upper polarizer plate POL2 by a variety of methods described below.

According to a first forming method, electrically conductive fine particles of carbon are mixed into the sticky layer between the polarizer plate POL2 and the substrate SUB2.

According to a second forming method, fine metallic particles are dispersed in the sticky layer.

When such fine metallic particles are used, the electrically conductive property is further improved, the shielding function is strengthened, and abnormal display caused by static electricity from the external side is further suppressed.

In order to prevent coloring at a particular wavelength, in this case, the fine metallic particles may have a plurality of particle sizes or may include those of a plurality of materials.

According to a third forming method, fine particles of a transparent and electrically conductive metal oxide are dispersed in the sticky layer.

The metal oxide may be ITO (indium-tin-oxide), $SnO_2$ or $In_2O_3$. Since reduction in the amount of light transmission is greatly suppressed, the backlight unit consumes a decreased amount of electric power.

According to the third forming method, the polarizer plate POL2 itself has an electrical conductivity.

For instance, the main surface of the polarizer plate POL2 may be coated with the ITO layer, or the polarizer plate may be formed of a material having an electrical conductivity.

Alternatively, an electrical conductivity may be imparted to any one of the layers constituting the polarizer plate.

In this case, no material needs be mixed into the sticky layer itself, making it possible to avoid a problem such as drop in the adhesion when the polarizer plate POL2 is stuck to the upper substrate SUB2.

According to a fourth forming method, a transparent sheet having an electrical conductivity is interposed between the polarizer plate POL2 and the upper substrate SUB2. Here, the conductive transparent sheet chiefly comprises an organic material such as polyethylene containing fine ITO particles.

By using the conductive transparent sheet which is provided separately from the polarizer plate POL2, optimum performance can be obtained offering a margin in selecting the members of the liquid crystal display device.

According to a fifth forming method, the ITO film is formed as a transparent electrically conductive film on nearly the whole region of the substrate SUB2 on the opposite side to the liquid crystal layer LC, and the polarizer plate POL2 is stuck onto the upper surface of the ITO film. The ITO film can be formed by, for example, sputtering.

The transparent electrically conductive film is in no way limited to the ITO film only but may be, for example, a $SnO_2$ film or $In_2O_3$ film to exhibit the same effect.

<<Constitution of the Periphery of the Matrix>>

Figure 17:
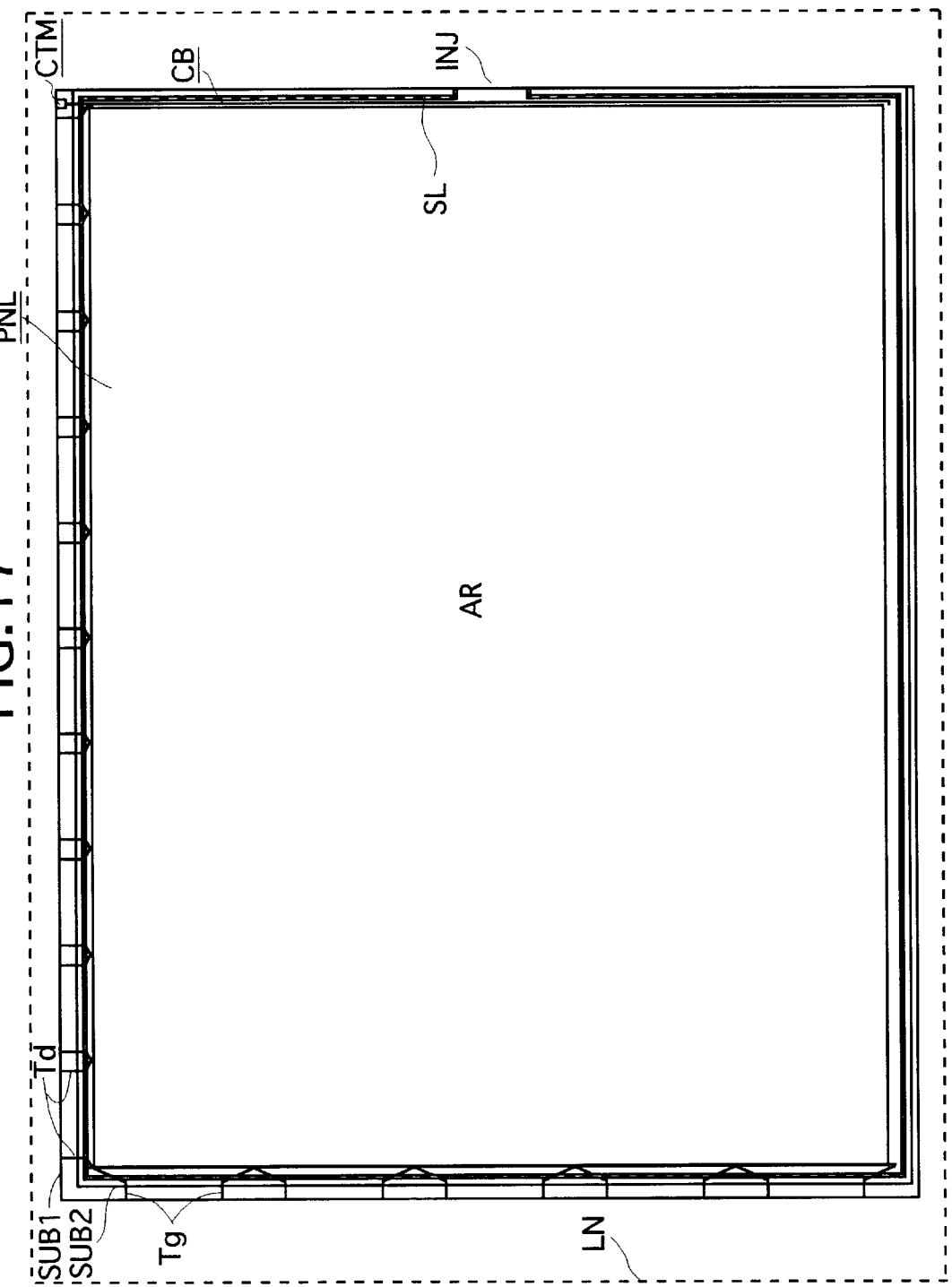
FIG. 17 is a plan view illustrating the constitution of the periphery of the matrix of a display panel.

FIG. 17 is a plan view illustrating essential portions of the periphery of the matrix (AR) of the display panel PNL that include the upper and lower glass substrates SUB1, SUB2.

When panels of a small size are to be produced, a plurality of devices are fabricated simultaneously on a single glass substrate which is then divided to enhance the throughput. When the panels of a large size are to be produced, the glass substrate of a standard size is fabricated irrespective of the type to commonly utilize the production facility, and is cut into a size that meets the required type. In either case, the glass is cut after having passed through predetermined steps.

FIGS. 17 illustrates the latter case, i.e., illustrates both the upper and lower substrates SUB1 and SUB2 after there have been cut, wherein LN denotes the edges before these substrates are cut. In the finished state in either case, the size of the upper substrate SUB2 is limited to be inside the lower substrate SUB1 so that the portions that include the external connection terminal groups Tg, Td and terminals CTM (upper side and left side in the drawing) are exposed.

The terminal groups Tg, Td are named by combining the scanning circuit connection terminals GTM, video signal circuit connection terminals DTM and outgoing wires therefrom into units of tape carrier packages TCP (FIGS. 20 and 21) in which an integrated circuit chip CHI is mounted. The outgoing wires from the matrix portion in each group to the external connection terminals are inclined toward both ends thereof.

This is because it is necessary to cause the terminals DTM and GTM of the display panel PNL to match the pitch for arranging the packages TCP and the pitch of the connection terminals of the packages TCP. The counter electrode terminal CTM serves to apply a counter voltage to the counter electrode CT from an external circuit.

The counter electrode signal lines CL of the matrix units are drawn to the opposite side (right side in the drawing)

with respect to the scanning circuit terminals GTM, and are grouped through a common bus line CB which is then connected to the counter electrode terminals CTM.

A seal pattern SL is formed between the transparent glass substrates SUB1 and SUB2 along the edges thereof except for the liquid crystal sealing port INJ to seal the liquid crystals LC therein. The sealing material is composed of, for example, an epoxy resin.

The orientation films ORI1 and ORI2 are formed on the inside of the sealing pattern SL. The polarizer plates POL1 and POL2 are formed on the outer surface of the lower transparent glass substrate SUB1 and on the outer surface of the upper transparent glass substrate SUB2.

The liquid crystals LC are sealed in a region partitioned by the sealing pattern SL between the lower orientation film GRI1 and the upper orientation film ORI2 that determine the initial orientation directions of liquid crystal molecules.

The lower orientation film ORI1 is formed on the protective film PSV1 of the lower transparent glass substrate SUB1 side.

<<Overall Equivalent Circuit of the Display Device>>

Figure 18:
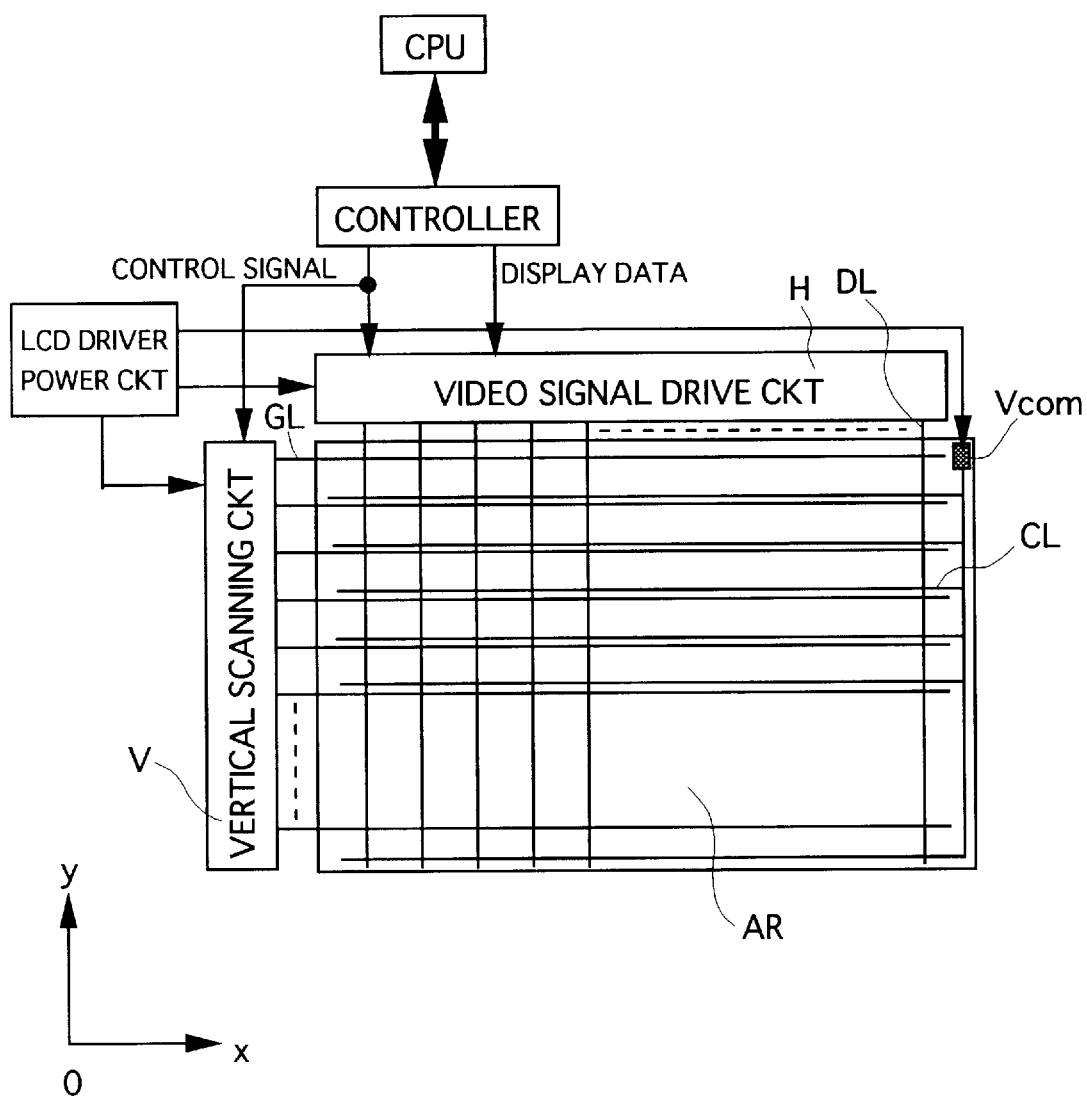
FIG. 18 is a circuit diagram of a matrix portion and the periphery thereof in the active matrix-type color liquid crystal display device of the present invention.

Referring to FIG. 18, the liquid crystal display panel has a set of a plurality of pixels arranged in the form of a matrix, and each pixel is capable of independently modulating the transmitted light from the backlight arranged at the back of the liquid crystal display substrate.

The liquid crystal display panel is provided, as external circuits, with a vertical scanning circuit V and a video signal driver circuit H. A scanning signal (voltage) is supplied successively to the gate signal lines GL from the vertical scanning circuit V, and a video signal (voltage) is applied to the drain signal lines DL from the video signal driver circuit H synchronously with the timing of the supply of the scanning signal.

The vertical scanning circuit V and the video signal driver circuit H are fed with electric power from a liquid crystal driver power source circuit, and receive image data from the CPU which are divided by a controller into display data and control signals.

<<Driving Method>>

Figure 19:
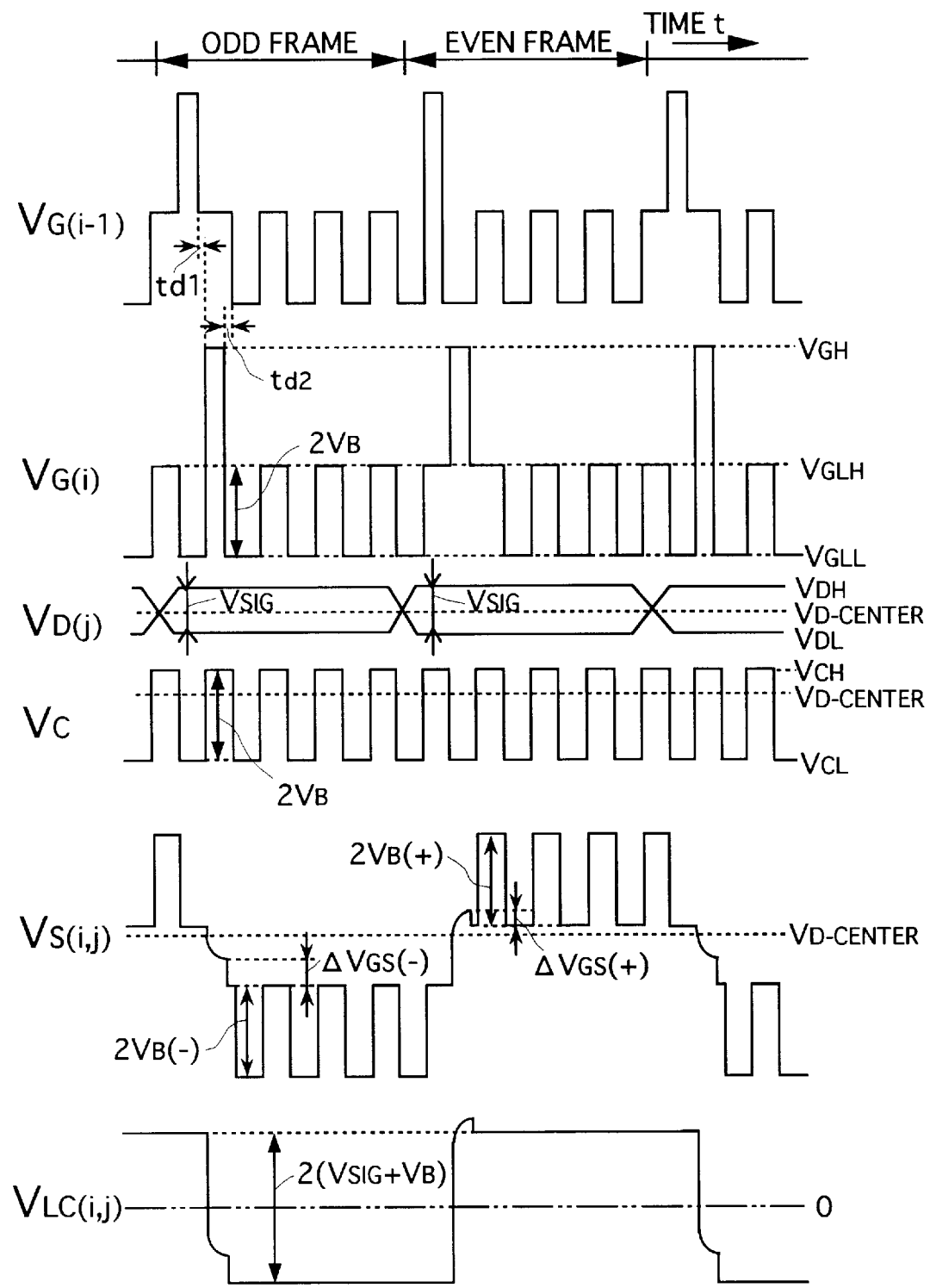
FIG. 19 is a diagram illustrating drive waveforms in the active matrix-type color liquid crystal display device of the present invention.

FIG. 19 illustrates drive waveforms of the liquid crystal display device of the present invention.

The counter voltage has a binary alternating rectangular waveform of VCH and VCL, and the non-selection voltage of scanning signals VG(i−1) and VG(i) is changed from one to the other of two values of VGLH AND VGLL after every scanning period in synchronism therewith.

The amplitude of the counter voltage is the same as the amplitude of the non-selection voltage. The video signal voltage is equal to a voltage obtained by subtracting one-half the amplitude of the counter voltage from the voltage that is desired to be applied to the liquid crystal layer.

The counter voltage may be a DC voltage. By using the AC counter voltage, however, the maximum amplitude of the video signal voltage can be decreased, and a video signal driver circuit (driver of the signal side) having a low withstand voltage can be employed.

<<Function of the Storage Capacitor Cstg>>

The storage capacitor Cstg is provided to store, for extended periods of time, the video data that is written in a pixel after the thin-film transistor TFT is turned off.

In the system in which the electric field is applied almost in parallel with the substrate surface as employed in the present invention, there exists very little capacitance (so-called liquid crystal capacitance) constituted by the pixel electrode and the counter electrode unlike that of the system in which the electric field is applied perpendicularly to the substrate surface. Therefore, the storage capacitor Cstg is an indispensable constituent element.

The storage capacitor Cstg also serves to decrease the effect of a gate potential change ΔVg with respect to the pixel electrode potential Vs when the thin-film transistor TFT undergoes the switching operation. This can be expressed by the following formula, $$\Delta Vs = \{Cgs/(Cgs+Cstg+Cpix)\} \times \Delta Vg \qquad [\text{Eq. 3}]$$

where Cgs is a parasitic capacitance formed between the gate electrode GT and the source electrode SD1 of the thin-film transistor TFT, Cpix is a capacitance formed between the pixel electrode PX and the counter electrode CT, and ΔVs is a change in the pixel electrode potential caused by ΔVg, i.e., is a feed-through voltage.

The change ΔVs becomes a cause a DC component that is added to the liquid crystals LC, but can be decreased by increasing the storage capacitor Cstg. A decrease in the DC component applied to the liquid crystals LC helps lengthen the life of the liquid crystals LC and decreases the so-called sticking in which the preceding image remains when the image displayed on the liquid crystals changes.

As described earlier, since the gate electrode GT has a large size to completely cover the i-type semiconductor layer AS, the overlapping area of the source electrode SD1 with the drain electrode SD2 increases and, hence, the parasitic capacitance Cgs increases, causing the pixel electrode potential Vs to be easily affected by the gate (scanning) signal Vg. This demerit, however, is overcome by the provision of the storage capacitor Cstg.

<<Method of Production>>

Figure 13:
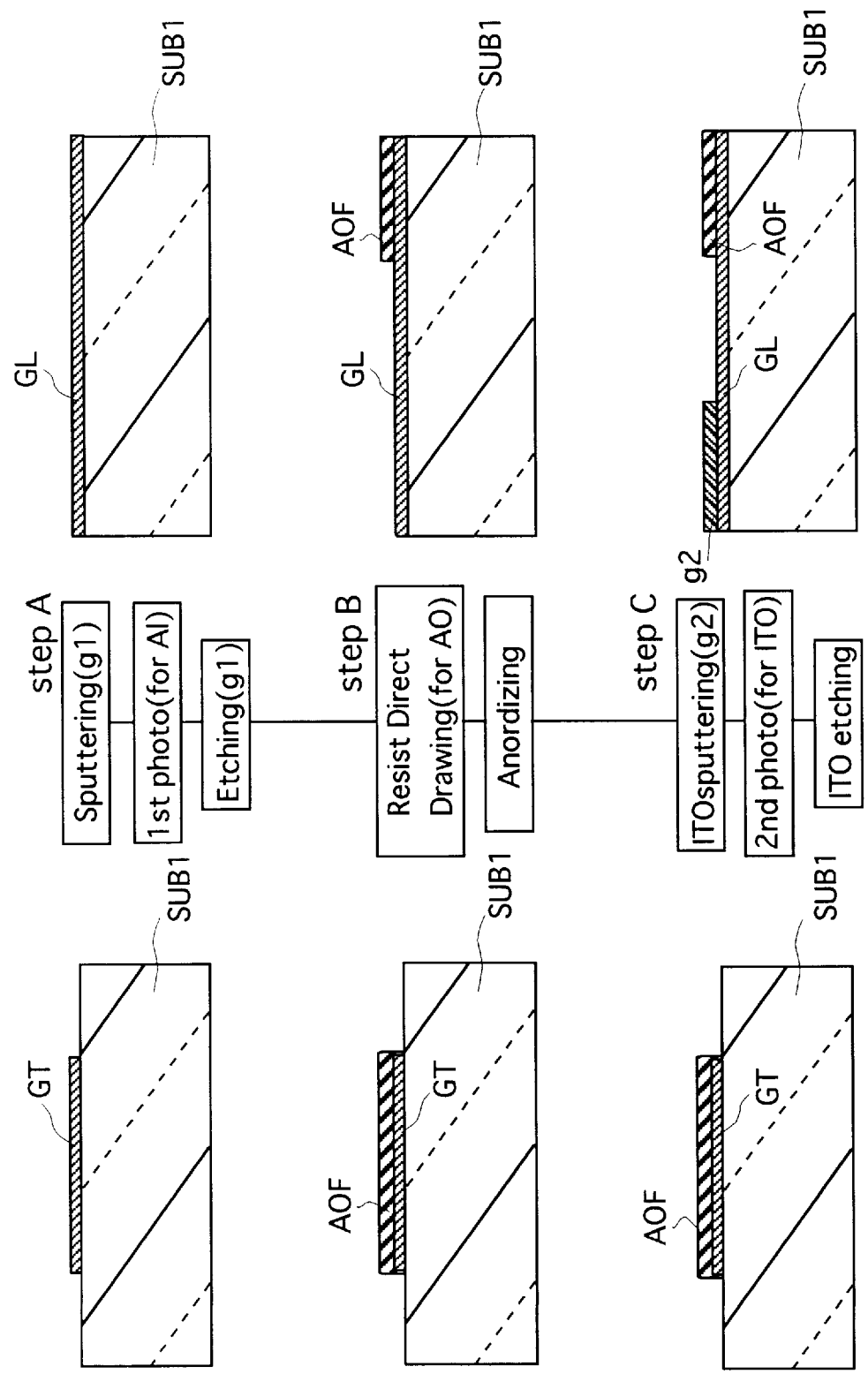
FIG. 13 is a flowchart of sectional views of a thin film transistor portion and a gate terminal portion, illustrating the fabrication steps A to C on the substrate SUB1 side.
Figure 14:
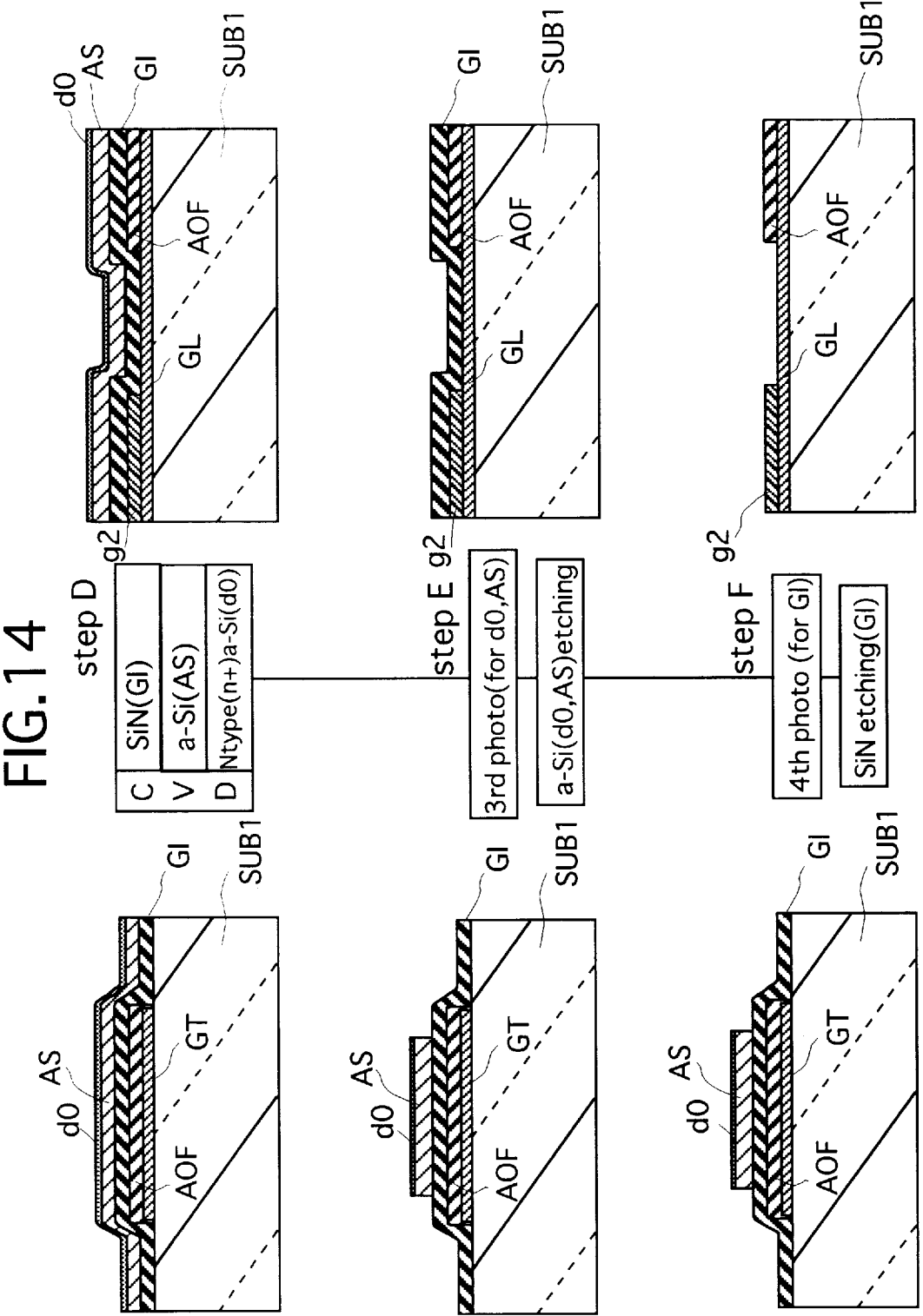
FIG. 14 is a flowchart of sectional views of the thin film transistor portion and the gate terminal portion, illustrating the fabrication steps D to F on the substrate SUB1 side.
Figure 15:
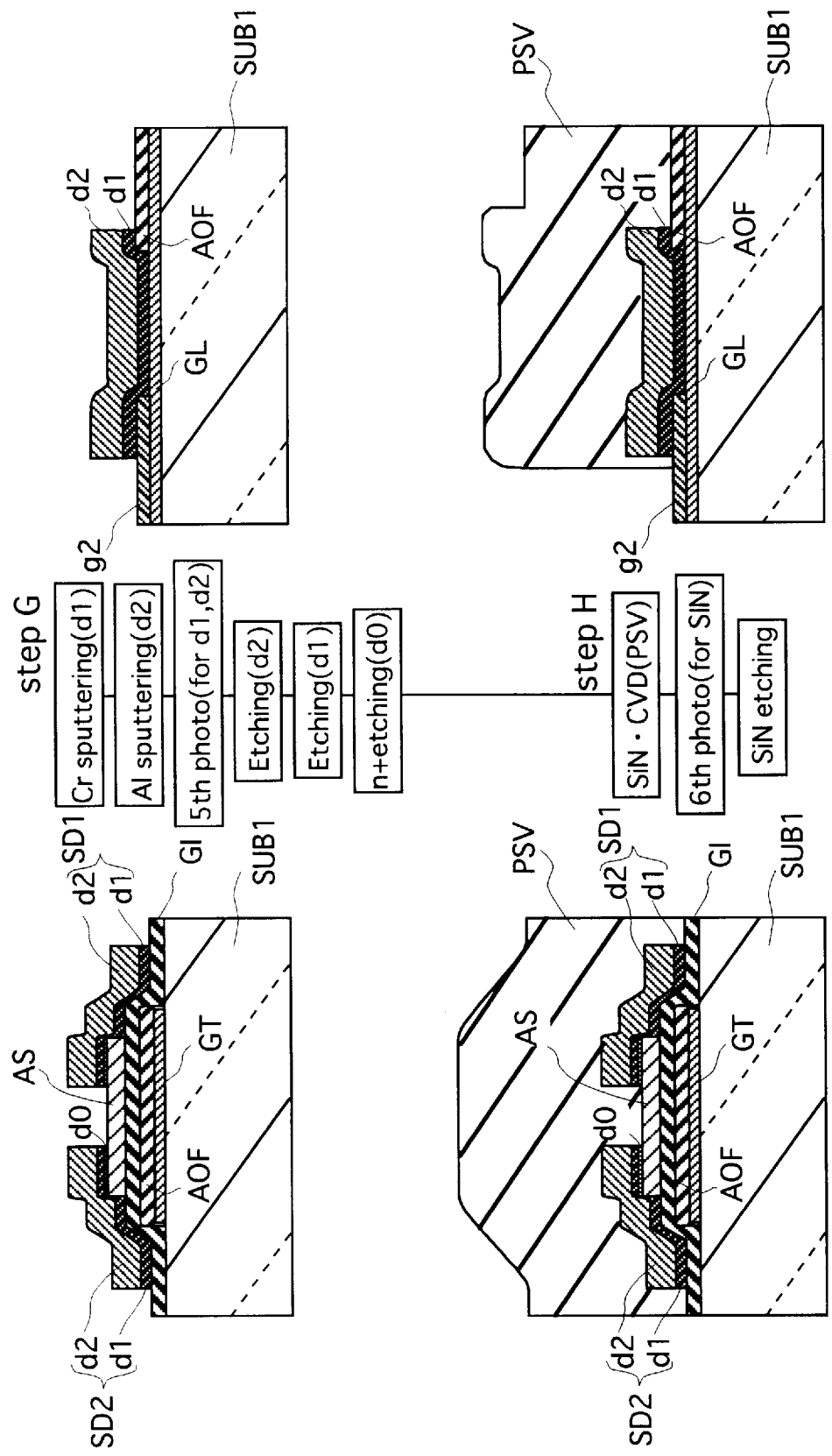
FIG. 15 is a flowchart of sectional views of the thin film transistor portion and the gate terminal portion, illustrating the fabrication steps G to H on the substrate SUB1 side.

Described below with reference to FIGS. 13 to 15 is a method of producing the substrate SUB1 in the above-mentioned liquid crystal display device.

Figure 22:
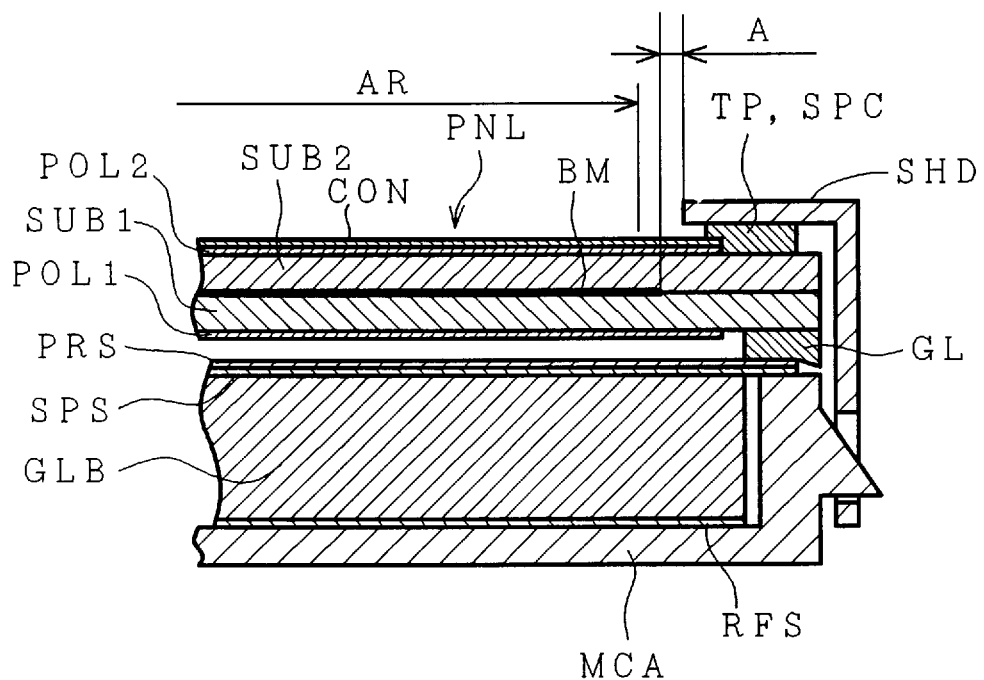
FIG. 22 is a sectional view of the liquid crystal display module cut along the line F-F' in FIG. 21.

In the drawings, the words at the center show abbreviated names of the steps, and the left side diagram illustrates the flow of processing in cross section of the thin-film transistor TFT portion shown in FIG. 11 and the right side diagram illustrates the flow of processing in cross section of the vicinity of the gate terminal shown in FIG. 22.

Except for the steps B and D, the steps A to I are divided depending upon the photographic processing. Sectional views of these steps illustrate stages after the photographic processing is finished and the photoresist is removed.

The photographic processing involves a series of operations from the application of a photoresist through selective exposure to light using a mask up to the developing. The same description will not be repeated. The method of production will now be described according to the divided steps.

Step A, FIG. 13

Electrically conductive film g1 made of Al—Pd, Al—W, Al—Ta, Al—Ti—Ta or the like having a thickness of 3000 angstroms is formed by sputtering on the lower transparent glass substrate SUB1 of AN635 Glass (trade name).

After the photographic processing, the electrically conductive film g1 is selectively removed by etching with a mixed acid solution of phosphoric acid, nitric acid and glacial acetic acid. Thus, there are formed a first electrically conductive layer of a gate electrode GT, a scanning signal line GL, a counter electrode CT, a counter voltage signal line CL, an electrode PL1, a gate terminal GTM, a first electrically conductive layer of a common bus line CB, a first electrically conductive layer of a counter electrode terminal CTM, an anodically oxidized bus line SHg (not shown) for connecting the gate terminal GTM, and an anodically oxidized pad (not shown) connected to the anodically oxidized bus line SHg.

Step B, FIG. 13

After the anodically oxidized mask AO is formed by the direct drawing, the substrate SUB1 is immersed in an anodically oxidizing solution prepared from 3% tartaric acid whose pH value is adjusted to 6.25±0.05 with ammonia, by diluting the pH-adjusted tartaric acid with an ethylene glycol solution into 1:9, and a forming current density is adjusted to 0.5 mA/cm$^2$ (constant-current formation).

Then, the anodic oxidation is carried out until a formation voltage of 125 V is accomplished that is necessary for forming an $Al_2O_3$ film having a predetermined thickness.

It is desirable for this state to be maintained for several tens of minutes (constant-voltage formation). This is important from the standpoint of forming a uniform $Al_2O_3$ film.

Thus, the electrically conductive film g1 is anodically oxidized, and the anodically oxidized film AOF having a thickness of 1800 angstroms is formed on the gate electrode GT, scanning signal line GL, counter electrode CT, counter voltage signal line CL and the electrode PL1.

Step C, FIG. 13

A transparent electrically conductive film g2 of an ITO film having a thickness of 1400 angstroms is formed by sputtering.

After the photographic processing, the transparent electrically conductive film g2 is selectively removed by etching using, as an etching solution, a mixed acid solution of hydrochloric acid and nitric acid, thereby to form the uppermost layer of the gate terminal GTM and the second electrically conductive layer of the drain terminal DTM and the counter electrode terminal CTM.

Step D, FIG. 14

A silicon nitride film having a thickness of 2200 angstroms is formed by introducing ammonia gas, silane gas and nitrogen gas into a plasma CVD apparatus, an i-type amorphous silicon film having a thickness of 2000 angstroms is formed by introducing silane gas and hydrogen gas into the plasma CVD apparatus, and an N(+)-type amorphous silicon film having a thickness of 300 angstroms is formed by introducing silane gas, hydrogen gas and phosphine gas into the plasma CVD apparatus.

Step E, FIG. 14.

After the photographic processing, the N(+)-type amorphous silicon film and the i-type amorphous silicon film are selectively removed by etching by using $SF_6$ as a dry etching gas, thereby to form an island of the i-type semiconductor layer AS.

Step F, FIG. 14

After the photographic processing, the silicon nitride film is selectively removed by etching by using $SF_6$ as a dry etching gas.

Step G, FIG. 15

An electrically conductive film d1 of chromium having a thickness of 600 angstroms is formed by sputtering, and an electrically conductive film d2 of Al—Pd, Al—Si, Al—Ta or Al—Ti—Ta having a thickness of 4000 angstroms is formed by sputtering.

After the photographic processing, the electrically conductive film d2 is removed by etching using the same solution as the one used in the step A, and the electrically conductive film d1 is removed by etching using a solution of ammonium ceric nitrate in order to form a second electrically conductive layer and a third electrically conductive layer of video signal line DL, source electrode SD1, drain electrode SD2, pixel electrode PX, electrode PL2, common bus line CB, and a bus line SHd (not shown) for short-circuiting the drain terminal DTM.

Next, $SF_6$ gas is introduced into the dry etching apparatus to remove the N(+)-type amorphous silicon film by etching, thereby to selectively remove the N(+)-type semiconductor layer d0 between the source and the drain.

Step H, FIG. 15

A silicon nitride film having a thickness of 5000 angstroms is formed by introducing ammonia gas, silane gas and nitrogen gas into the plasma CVD apparatus.

After the photographic processing, the silicon nitride film is selectively removed by etching, based on a photoetching technique, using $SF_6$ as a dry etching gas, thereby to form a protective film PSV1.

<<Display Panel PNL and the Driver Circuit Substrate PCB1>>

Figure 20:
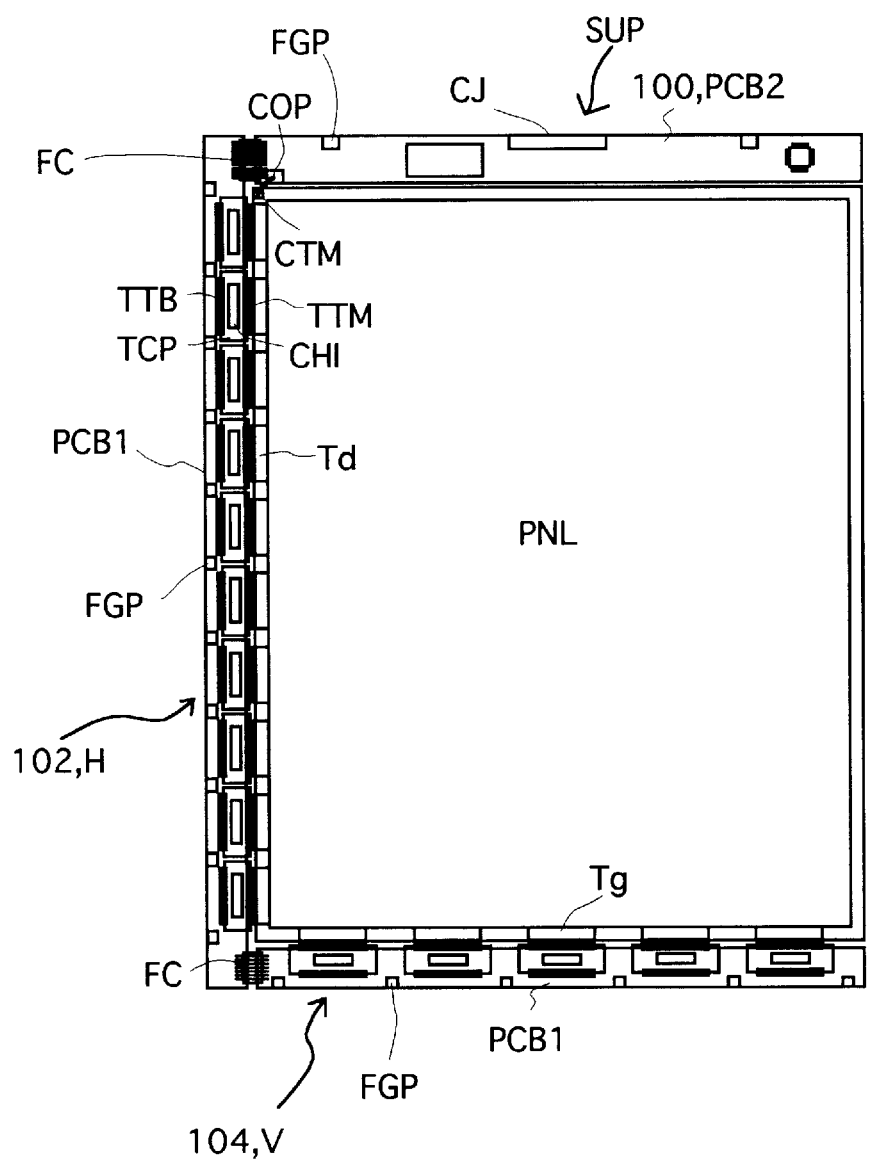
FIG. 20 is a top view illustrating a state that a peripheral driver circuit is mounted on the liquid crystal display panel.

FIG. 20 is a top view illustrating a state wherein the video signal driver circuit H and the vertical scanning circuit V are connected to the display panel PNL shown in FIG. 17.

Symbol CHI denotes driver IC chips (five chips on the lower side are driver IC chips on the vertical scanning circuit side, and the left ten chips are driver IC chips on the video signal driver circuit side) for driving the display panel PNL.

As will be described later with reference to FIGS. 21 and 22, symbol TCP denotes a tape carrier package in which are mounted the driver IC chips CHI by a tape automated bonding method (TAB), and PCB1 denotes a driver circuit substrate on which are mounted the TCP, capacitors, etc., and which is divided into two for the video signal driver circuit and for the scanning signal driver circuit.

Symbol FGP denotes a frame grounding pad to which is soldered a spring-like piece that is provided cutting a shielded case SHD.

FC denotes a flat cable for electrically connecting the driver circuit substrate PCB1 on the lower side to the driver circuit board PCB1 on the left side.

As shown, the flat cable FC comprises a plurality of lead wires (phosphor bronze plated with tin) which are supported by sandwiching them between striped polyethylene layer and polyvinyl alcohol layer.

<<Whole Constitution of the Liquid Crystal Display Module>>

Figure 21:
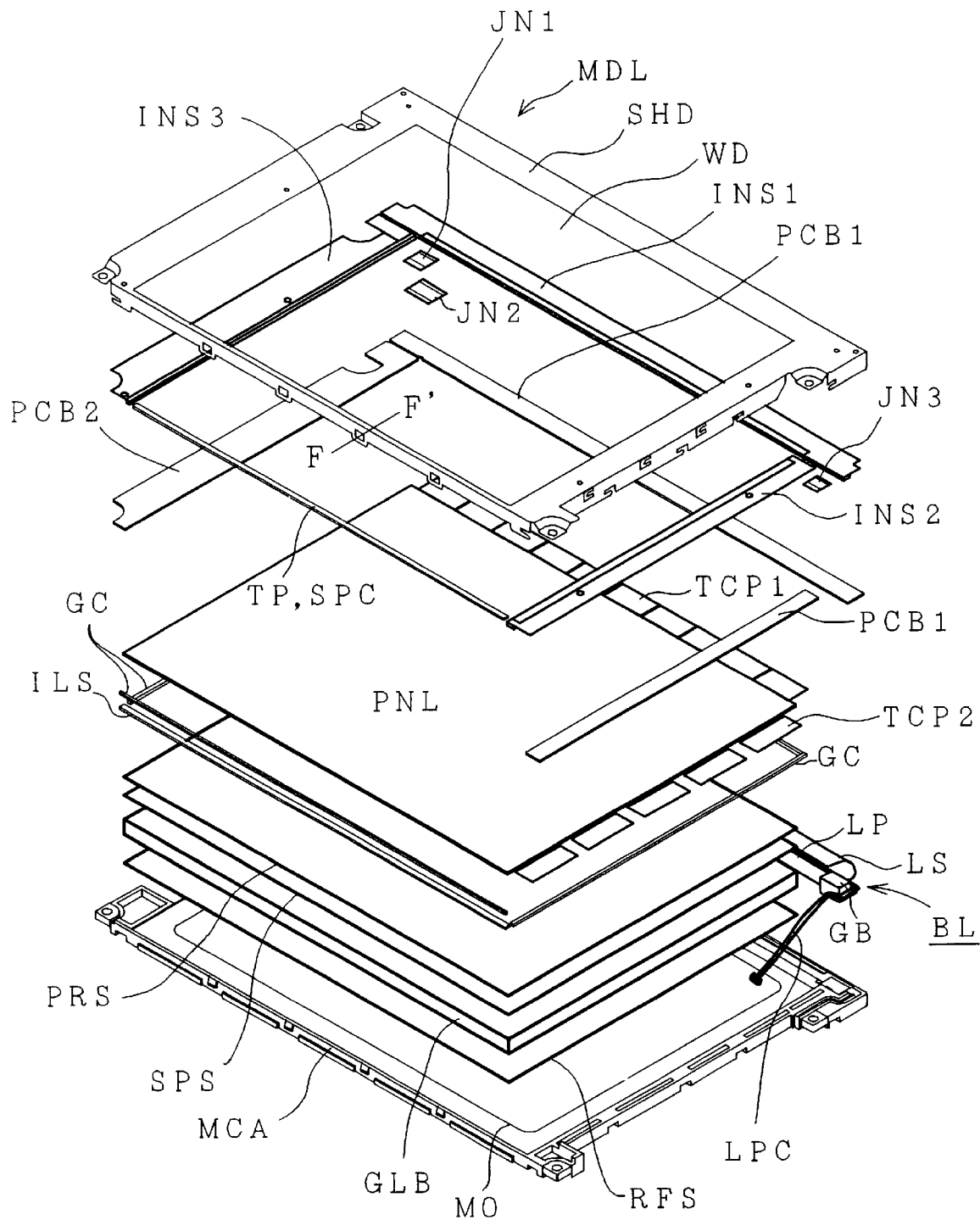
FIG. 21 is an exploded perspective view illustrating a liquid crystal display module.

FIG. 21 is an exploded perspective view illustrating the constituent components of the liquid crystal display module MDL, wherein symbol SHD denotes a picture-frame-like shielding case (metal frame) made of a metal plate, WD denotes a display window, PNL denotes a liquid crystal display panel, SPS denotes a light diffuser plate, GLB denotes a light guide, RFS denotes a reflector plate, BL denotes a backlight fluorescent tube, and MCA denotes a lower case (backlight case).

These members are stacked one upon the other maintaining a relationship as shown to thereby assemble the module MDL.

The module MDL is secured by pawls and hooks provided on the shielding case SHD.

Here, the housing MD is a combination of the shielding case SHD and the backlight casing MCA.

The back light casing MCA has a structure to accommodate the backlight fluorescent tube BL, light diffuser plate SPS, light guide GLB and reflector plate RFS.

The light of backlight fluorescent tube BL arranged on the light guide GLB side is turned into uniform backlight on the display surface through the light guide GLB, reflector plate RFS and light diffuser plate SPS, and is permitted to go out to the liquid crystal display panel PNL side.

An inverter circuit board is connected to the backlight fluorescent tube BL and serves as a power source for the backlight fluorescent tube BL.

<<Embodiment of the Liquid Crystal Display Module>>

Embodiment of the present invention will now be described according to the following examples.

[EXAMPLE 1]

FIG. 1 is a sectional view illustrating an example 1 of the present invention.

FIG. 1 illustrates essential portions on an enlarged scale so that the relationship among the outer circumference of the light-shielding film BM, sealing portion SL, polarizer plates POL, and open region WD in the housing MD of the module can be easily understood.

For the sake of convenience, peripheral driver circuits and substrates, as shown in FIG. 20, are abbreviated in FIG. 1 as well as in FIGS. 2 to 7.

The active matrix substrate SUB1 and the color filter substrate SUB2 are joined together with the sealing member SL, and liquid crystals LC are sealed therein to constitute a liquid crystal display panel PNL.

Polarizer plates POL1 and POL2 are stuck to the surfaces of the active matrix substrate SUB1 and the color filter substrate SUB2 disposed on opposite sides of the liquid crystal layer.

The liquid crystal display panel PNL and the backlight unit BL are contained in the housing MD to constitute a liquid crystal display device. Here, the housing MD is made up of a combination of a metallic shielding case SHD and a lower case MCA.

In this example, in a plan view, the inner edges of the sealing material SL are spaced from the black matrix BM by about 1 mm.

Accordingly, the stress applied at the step of sealing the liquid crystals is exerted between the sealing member SL and the overcoat film OC or between the overcoat film OC and the glass substrate SUB2.

Therefore, the black matrix BM does not separate from the underlying film or the overcoat film OC even when they are not so firmly joined together, eliminating any possibility that the liquid crystals will not remain sealed therein.

The width of the area where the sealing member SL is formed is about 1.5 mm.

The distance between the outer edge of the sealing member SL and the end of the substrate SUB2 is determined to be about 1 mm, taking the dicing precision into consideration.

Assuming that the regions A, L and L' in FIG. 1 are not covered by the upper and lower polarizer plates, the backlight leaks through these regions.

It is further desirable that the width L of the area where the polarizer plates POL1 and POL2 are overlapped on the housing MD is larger than 0.5 mm.

Usually, the precision of sticking the polarizer plates POL1 and POL2 is about 0.5 mm in the case of 3s.

With the polarizer plates being overlapped on the housing with a width of more than 0.5 mm, therefore, the leakage of backlight can be prevented with a probability of not smaller than about 99.7% even when the polarizer plates are deviated at the time of being stuck.

In this example, therefore, the width L of overlapping is determined to be about 1.5 mm.

By this constitution, the leakage of the backlight is prevented by the two polarizer plates.

The distance A between the effective display area AR and the edge of the open region WD of the housing MD is determined to be about 1.5 mm by taking the precision at the time of assembling into consideration.

In this example as shown in FIG. 9, a crossed-Nicols arrangement is employed in which the axis of polarization MAX1 of the polarizer plate POL1 is deviated by 90° from the axis of polarization MAX2 of the polarizer plate POL2, to most effectively block the light.

It is further desirable that the gap L' between the ends of the polarizer plates POL1, POL2 and the ends of the active matrix substrate SUB1 and the color filter substrate SUB2 is not smaller than 0.5 mm.

This is because, like the width of th overlap of the polarizer plates POL on the housing MD, the precision of positioning the polarizer plates POL is about 0.5 mm in the case of 3 σ.

With the gap L' determined to be not smaller than 0.5 mm, therefore, the polarizer plates POL are prevented from protruding beyond the active matrix substrate SUB1 or the color filter substrate SUB2 with a probability of not smaller than about 99.7% even when the polarizer plates are deviated at the time of being mounted, and the production yield is prevented from lowering at the step of mounting the polarizer plates and at the step of assembling the housing (step of placing the liquid crystal substrate in the housing).

In this example, therefore, the width L' of overlapping is determined to be about 1.0 mm.

With the gap L' determined to be not smaller than 0.5 mm, furthermore, a rubber cushion GC, a spacer SPC or a tape TP can be in direct contact with the substrate SUB1 or the substrate SUB2 as shown in FIG. 22, making it possible to support the liquid crystal panel PNL by the housing MD without exerting excessive pressure on the polarizer plate.

Moreover, since the polarizer plates POL1 and POL2 are arranged in a crossed-Nicols state and are formed in a size larger than the open region WD of the housing MD, the circumference of the black matrix BM can be determined to be smaller than the open region WD of the housing MD.

It is therefore possible to bring the effective pixel region AR close to the outer periphery of the black matrix BM and, hence, to decrease the size of the frame portion of the liquid crystal display device.

In this example, the distance is about 0.5 mm between the effective pixel region AR and the outer circumference of the black matrix BM.

Accordingly, the distance between the effective pixel region AR and the outer edge of the substrate SUB2 can be decreased to about 4 mm and, hence, to decrease the size of the frame portion of the liquid crystal display device.

The above-mentioned light-shielding effect is achieved remarkably when the display mode of the liquid crystal display device is a normally-black mode.

In the liquid crystal display device of the normally black mode, the time when the screen is black is relatively long and, hence, leakage of light is conspicuous in the peripheral portions as described above.

In this example, furthermore, a transparent electrically conductive layer COM is formed on the surface of the polarizer plate POL2 that is stuck onto the substrate SUB2 so that the sheet resistivity is not larger than $2 \times 10^{14}$ $\Omega/\square$, more preferably not larger than $1 \times 10^{8}$ $\Omega/\square$, and the electrically conductive layer COM is electrically connected to the shielding case SHD of the housing MD using an electrically conductive spacer SPC having a sheet resistivity of not larger than $1 \times 10^{8}$ $\Omega/\square$.

The spacer SPC is coated with an electrically conductive sticky material on both surfaces thereof. After being stuck to the shielding case SHD, the spacer SPC is pressed and secured when it is assembled together with the lower case MCA by using pawls and hooks provided on the shielding case SHD.

The shielding case SHD is usually connected to a frame ground FGP of the driver circuit substrate shown in FIG. 20, and is connected to ground potential via an interface connector terminal.

Owing to this structure, the static electricity from outside diffuses in the electrically conductive layer COM and flows, through the spacer SPC, into the shielding case SHD.

Therefore, the quality of display is not deteriorated by the static electricity.

As the electrically conductive spacer, there can be used an electrically conductive rubber spacer, a metal foil tape, a silver paste, or an organic material containing both or either of electrically conductive beads or electrically conductive fibers.

A separate electrically conductive layer COM may not be necessary. Instead, the polarizer plate itself may contain electrically conductive particles in the surface layer so as to exhibit a sheet resistivity of not larger than $2 \times 10^{14}$ $\Omega/\square$, more preferably not larger than $1 \times 10^{8}$ $\Omega/\square$, to achieve the same effects.

FIGS. 21 and 22 illustrate a modular structure to which the example is applied.

FIG. 21 is an exploded perspective view of the liquid crystal display module. The electrically conductive spacer SPC or the electrically conductive double-sided tape TP may be disposed on at least one portion among the four sides of the substrate SUB2.

In this example, the electrically conductive spacer SPC or the electrically conductive double-sided tape TP is arranged on the narrowest side of the frame on which no circuit substrate is arranged.

FIG. 22 is a sectional view along the line F–F' of FIG. 21 after the liquid crystal display module is assembled.

[EXAMPLE 2]

Figure 2:
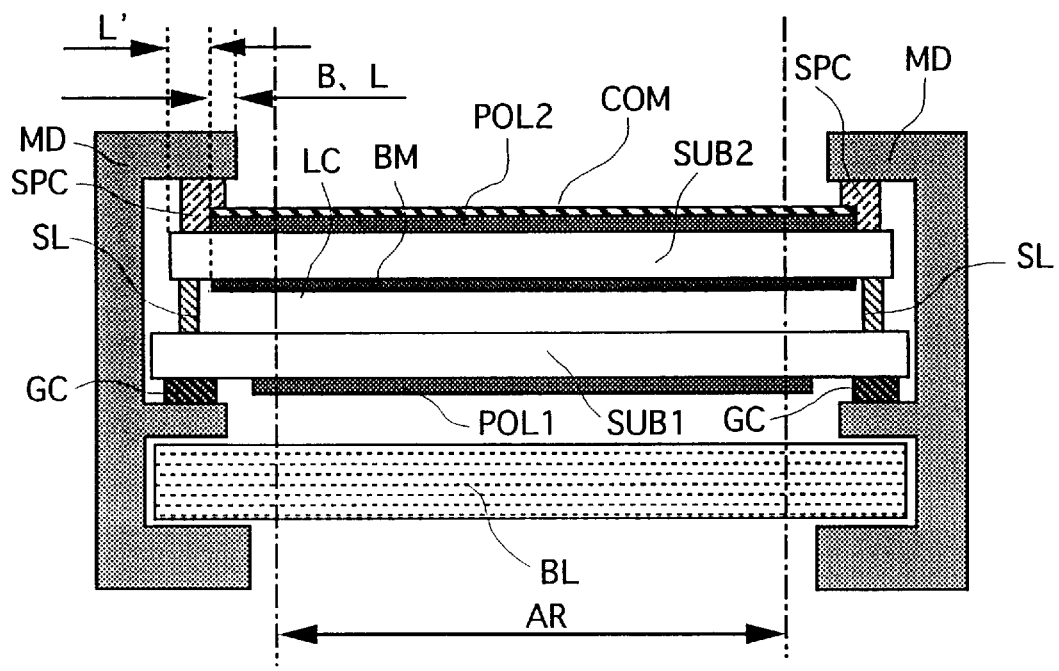
FIG. 2 is a sectional view illustrating, on an enlarged scale, essential portions of the periphery of the open region of the housing of a second example.

In an example 2 shown in FIG. 2, the polarizer plate POL1 stuck to the active matrix substrate SUB1 is larger, by more than about 6.5 mm, than the effective display region AR, but is smaller on a plane than the open region WD of the housing MD.

On the other hand, the polarizer plate POL2 stuck to the color filter substrate SUB2 is so formed as to be larger than the open region WD of the housing MD.

The effect of shielding the light is small since only one polarizer plate serves to block the light.

Therefore, the size of the light-shielding BM is larger than that of the open region WD of the housing MD.

It is desirable that the overlapping region B is not smaller than 0.5 mm, taking the positional precision into consideration.

In the example 2, the inner edges of the sealing member SL are spaced from the black matrix BM by about 1 mm, a sealing member SL having a width of about 1.5 mm is formed, a distance of about 1 mm is provided between the outer edges of the sealing member SL and the ends of the substrate SUB2, and a distance of about 1.5 mm is provided between the effective display region AR and the open region WD of the housing MD, taking the precision of assembling, positional precision and dicing precision into consideration as in the example 1.

Moreover, the polarizer plate POL2 is overlapped on the housing MD by about 1.5 mm so that the light may not leak and, at the same time, a distance as large as about 3.0 mm is provided between the effective pixel region AR and the outer circumference of the black matrix BM to block the light to a sufficient degree.

Therefore, the distance is about 6.5 mm between the effective pixel region AR and the outer edge of the substrate SUB2. Moreover, the polarizer plate POL1 is larger than the effective pixel region AR by about 1.0 mm.

According to this example, the substrate SUB1 and the rubber cushion GC or the substrate SUB2 and the spacer SPC come into contact with the polarizer plates POL at a decreased rate, making it possible to solve a problem that the polarizer plates become defective due to impact or vibration.

[EXAMPLE 3]

Figure 3:
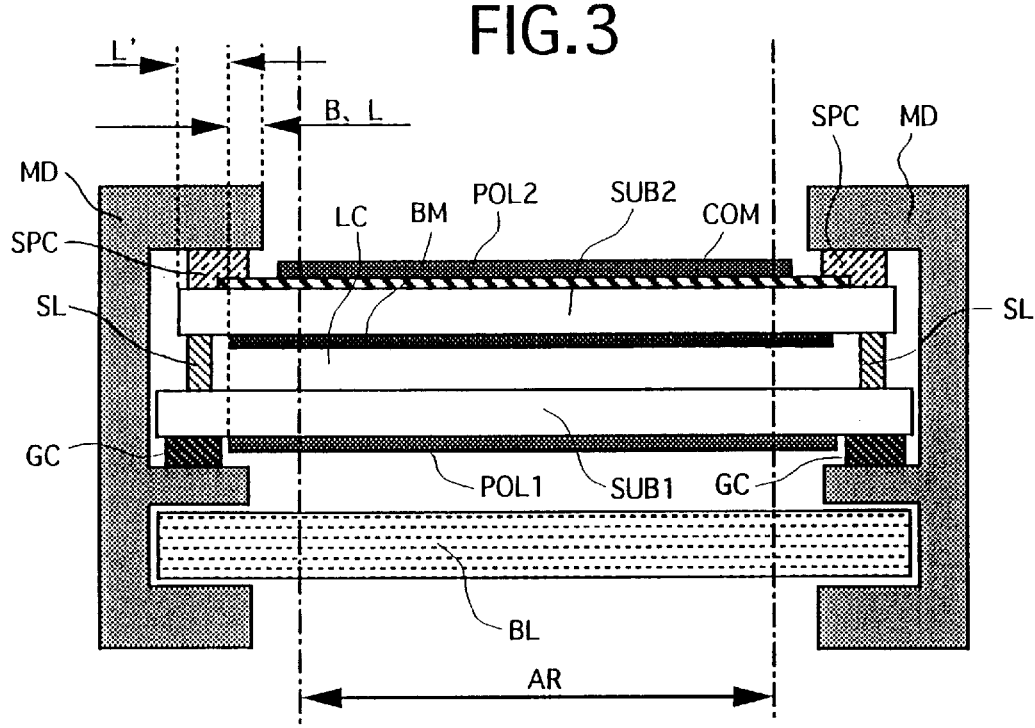
FIG. 3 is a sectional view illustrating, on an enlarged scale, essential portions of the periphery of the open region of the housing of a third example.

In an example 3 shown in FIG. 3, the polarizer plate POL2 stuck to the color filter substrate SUB2 is larger than the effective display region AR by more than about 0.5 mm but is smaller on a plane than the open region WD of the housing MD.

On the other hand, the polarizer plate POL1 stuck to the active matrix substrate SUB1 is larger than the open region WD of the housing MD.

In the example 3, the inner edges of the sealing member SL are spaced from the black matrix BM by about 1 mm, a sealing member SL having a width of about 1.5 mm is formed, a distance of about 1 mm is provided between the outer edges of the sealing member SL and the ends of the substrate SUB2, and a distance of about 1.5 mm is provided between the effective display region AR and the open region WD of the housing MD, taking the precision of assembling, positional precision and dicing precision into consideration as in the example 1.

Moreover, the polarizer plate POL1 is overlapped on the housing MD by about 1.5 mm so that the light may not leak and, at the same time, a distance as large as about 3.0 mm is provided between the effective pixel region AR and the outer circumference of the black matrix BM to block the light to a sufficient degree.

Therefore, the distance becomes about 6.5 mm between the effective pixel region AR and the outer edge of the substrate SUB2. Moreover, the polarizer plate POL2 is larger than the effective pixel region AR by about 0.7 mm.

In this example, the transparent electrically conductive layer COM such as an ITO film having a sheet resistivity of not larger than $2 \times 10^{14}$ $\Omega/\square$, more preferably not larger than $1 \times 10^{8}$ $\Omega/\square$, and a thickness of as very small as about several hundred angstroms, is formed on the surface of the substrate SUB2, and is electrically connected to the shielding case SHD of the housing MD via an electrically conductive spacer SPC having a sheet resistivity of not larger than $1 \times 10^{8}$ $\Omega/\square$.

Therefore, the electrically conductive layer COM is connected to the shielding case SHD through the electrically conductive spacer SPC with a connection resistance of not larger than $1 \times 10^{3}$ $\Omega$.

In this example, since the polarizer plate POL2 does not overlap the housing MD on a plane, the thickness of the device can be decreased by a thickness of the polarizer plate, i.e., by 1 to 2 mm.

On the substrate SUB2 side, furthermore, the spacer SPC does not come into direct contact with the polarizer plate POL2, and so the reliability is improved against impact and vibration.

Furthermore, the polarizer plates may be those available on the market.

[EXAMPLE 4]

Figure 4:
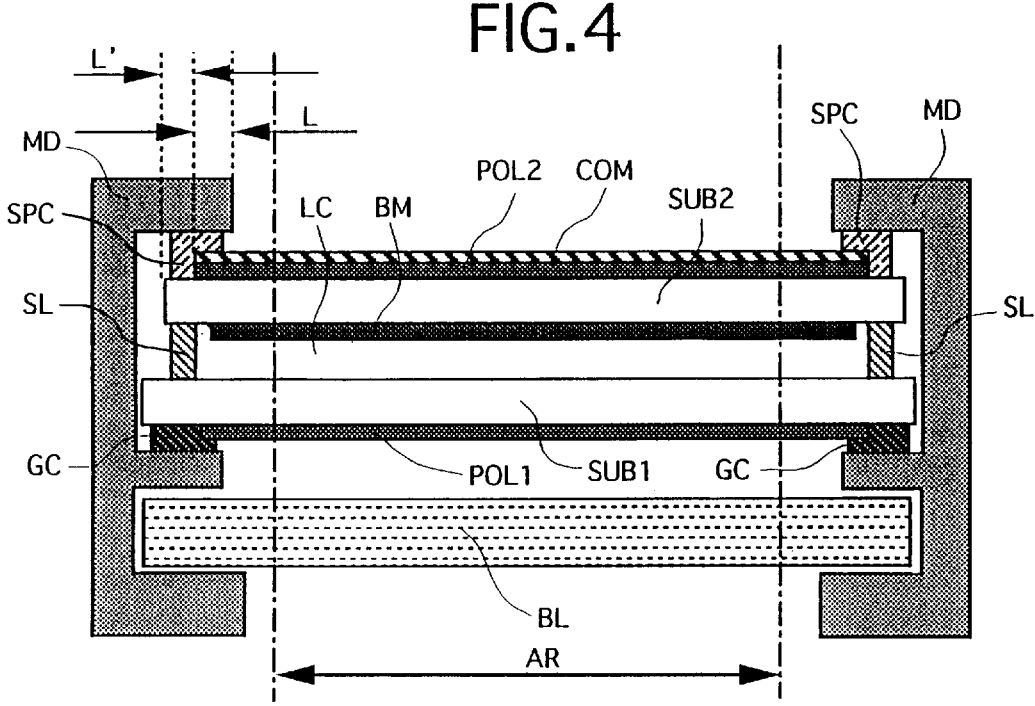
FIG. 4 is a sectional view illustrating, on an enlarged scale, essential portions of the periphery of the open region of the housing of a fourth example.

FIG. 4 illustrates an example 4.

Compared with the example 1 shown in FIG. 1, the black matrix BM has a different shape on a plane and has a size larger than the open region WD of the housing MD.

Moreover, the polarizer plates POL1 and POL2 are so arranged as to be overlapped on the housing MD. Thus, the leakage of backlight that cannot be blocked by the black matrix made of a resin composition only is blocked by the polarizer plates to a sufficient extent.

In the example 4, the inner edges of the sealing member SL are spaced from the black matrix BM by about 0.5 mm as an average distance. As this distance is too small, there are some portions where the outer edges of the black matrix BM are overlapping with the inner edges of the sealing member SL. However, the problem of leakage of liquid crystals can be prevented because the outer edges of the black matrix BM are kept inside the outer edges of the sealing member SL.

The sealing member SL having a width of about 1.5 mm is formed, a distance of about 1 mm is provided between the outer edges of the sealing member SL and the ends of the substrate SUB2, and a distance of about 1.5 mm is provided between the effective display region AR and the open region WD of the housing MD, taking the precision of assembling, positional precision and dicing precision into consideration as in the example 1.

Moreover, the polarizer plate POL1 and the polarizer plate POL2 are overlapped on the housing MD by about 1.5 mm so that the light may not leak and, at the same time, a distance as large as about 3.0 mm is provided between the effective pixel region AR and the outer circumference of the black matrix BM to block the light to a sufficient extent. Therefore, the distance becomes about 6.0 mm between the effective pixel region AR and the outer edge of the substrate SUB2.

[EXAMPLE 5]

Figure 5:
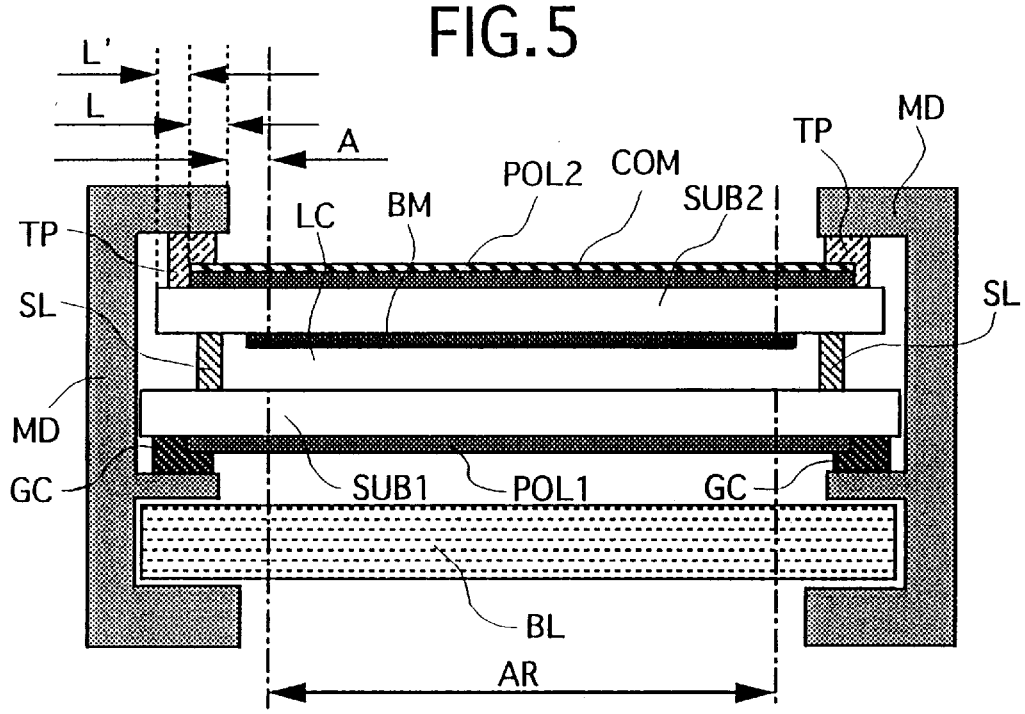
FIG. 5 is a sectional view illustrating, on an enlarged scale, essential portions of the periphery of the open region of the housing of a fifth example.

FIG. 5 illustrates an example 5.

What makes this example 5 different from the example 1 is that the electrically conductive layer COM and the shielding case SHD are joined together with an electrically conductive double-sided tape TP so that the connection resistance is not larger than $1 \times 10^3$ Ω.

[EXAMPLE 6]

Figure 6:
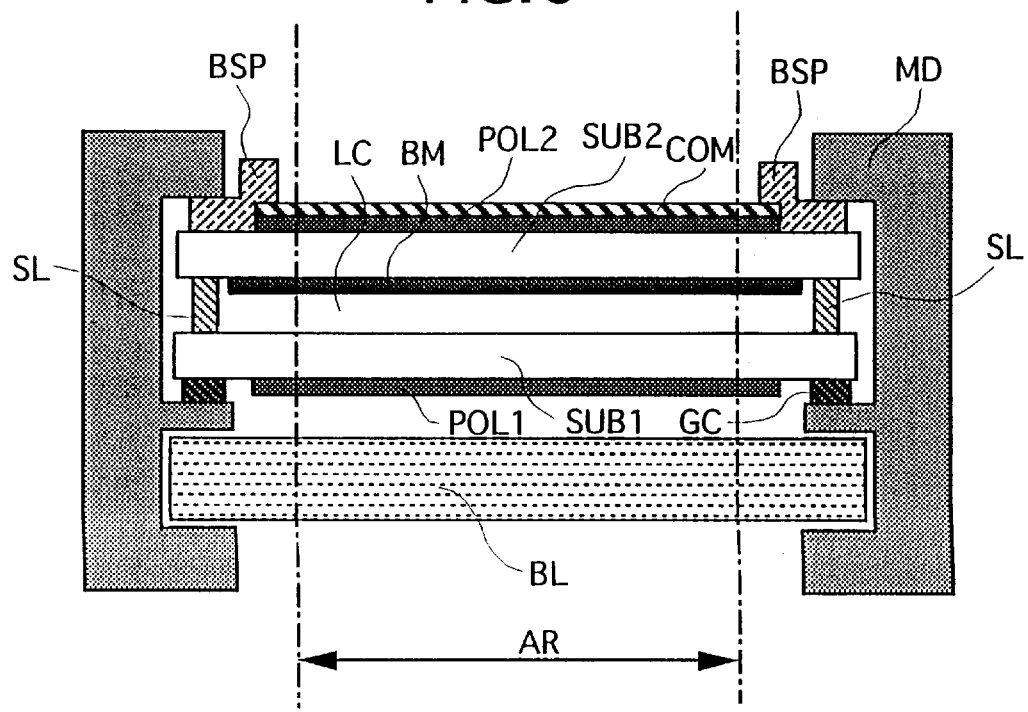
FIG. 6 is a sectional view illustrating, on an enlarged scale, essential portions of the periphery of the open region of the housing of a sixth example.
Figure 7:
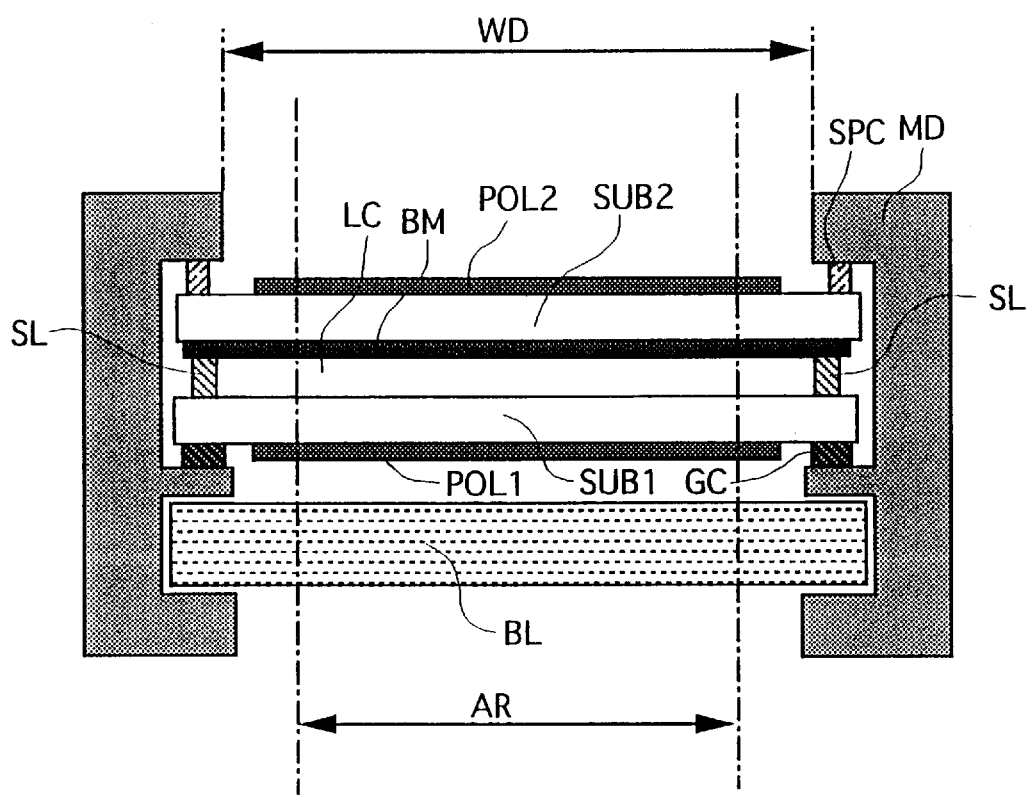
FIG. 7 is a sectional view illustrating, on an enlarged scale, essential portions of the periphery of the open region of the housing according to a prior art.
Figure 8:
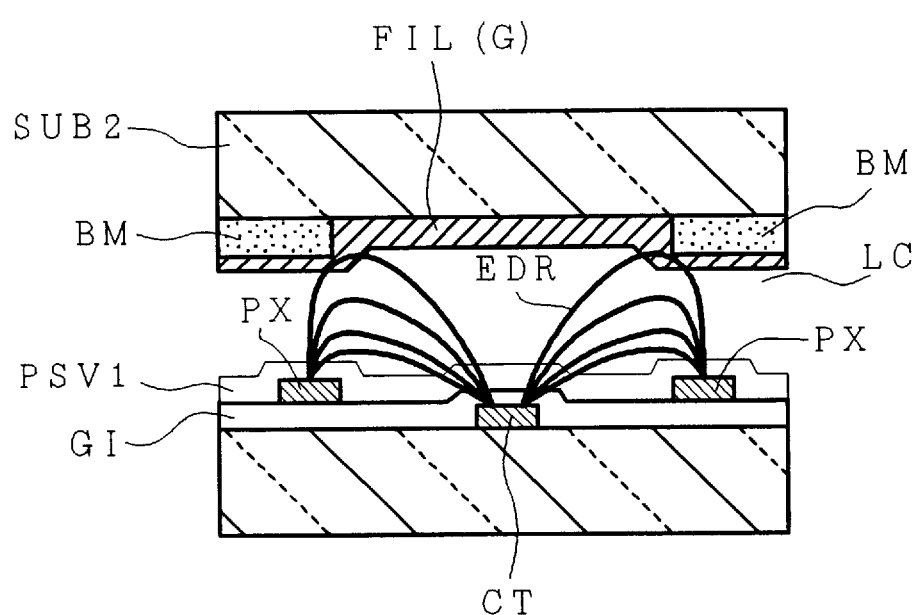
FIG. 8 is a sectional view schematically illustrating an applied electric field generated in a conventional in-plane field type liquid crystal display device.

FIG. 6 illustrates an example 6.

What makes this example different from the example 1 is that the black matrix BM and polarizer plates POL1 and POL2 are smaller on a plane than the open region WD of the housing MD.

In this example, however, the leakage of backlight is not prevented by the polarizer plates.

Therefore, a light-shielding spacer BSP cover the gap between the polarizer plate POL2 and the ends of the housing MD, so as to be overlapped on the polarizer plates and on the housing.

The spacer BSP exhibits an enhanced shielding effect when its sheet resistivity is not larger than $1 \times 10^8$ Ω/□.

In the example 6, the inner edges of the sealing member SL are spaced from the black matrix BM by about 1 mm, a sealing member SL having a width of about 1.5 mm is formed, a distance of about 1 mm is provided between the outer edges of the sealing member SL and the ends of the substrate SUB2, and a distance of about 1.5 mm is provided between the effective display region AR and the open region WD of the housing MD, taking the precision of assembling, positional precision and dicing precision into consideration as in the example 1.

Moreover, the polarizer plates POL1 and POL2 are larger than the effective pixel region AR by about 1.0 mm, and a distance of about 0.5 mm is provided between the polarizer plate POL2 and the outer circumference of the black matrix BM.

Moreover, in order to prevent the leakage of light, the light-shielding spacer BSP is so positioned as to cover the gap between the polarizer plate POL2 and the housing MD, and so as to be overlapped on the polarizer plates and on the housing. Therefore, the distance becomes about 5.0 mm between the effective pixel region AR and the outer edge of the substrate SUB2.

[EXAMPLE 7]

Figure 23:
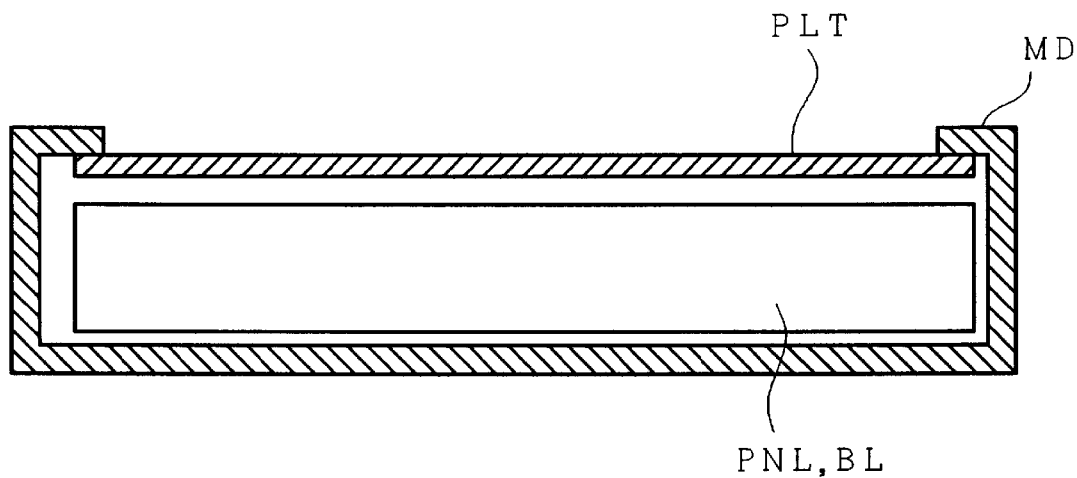
FIG. 23 is a sectional view illustrating essential portions of the liquid crystal display device of a seventh example.

FIG. 23 is a sectional view illustrating a further example 7 according to the present invention.

In this example, a transparent protective plate PLT is disposed in front of the upper transparent substrate SUB2 of the viewed side with a small gap from the upper transparent substrate, and is secured to the housing MD.

In this case, the protective plate does not have an electrical conductivity and, hence, has a function to prevent the user from directly touching the substrate SUB2 with his hand or a function to prevent the application of a high tension to the liquid crystal display panel from the human body.

The above-mentioned functions of the protective plate makes it possible to greatly decrease the possibility of charging the liquid crystal display panel and, hence, to suppress abnormal display.

[EXAMPLE 8]

Figure 24:
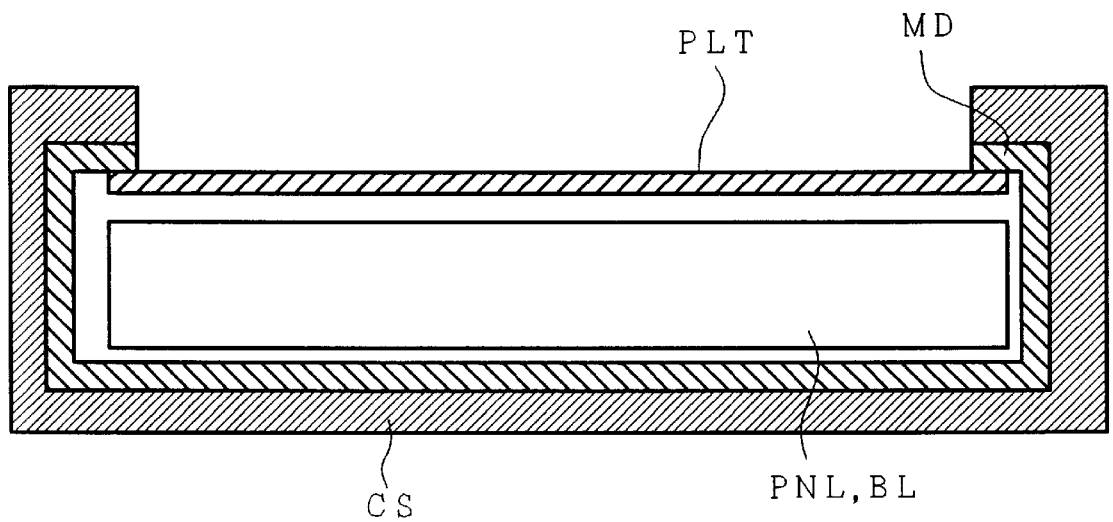
FIG. 24 is a sectional view illustrating essential portions of the liquid crystal display device of an eighth example.

FIG. 24 is a sectional view illustrating another example 8 of the present invention.

In this example, the housing MD is made of an electrically conductive material and is surrounded by a plastic case CS as a unitary structure.

In the case of this example, the EMI (electromagnetic interference) radiation characteristics are improved owing to the electrically conductive housing MD.

In this case, the protective plate PLT having an electrically conductive layer makes it possible to further enhance EMI radiation characteristics.

To accomplish the same object, furthermore, the liquid crystal display panel itself may be provided with an electrically conductive layer as has been explained in the foregoing example.

Figure 25:
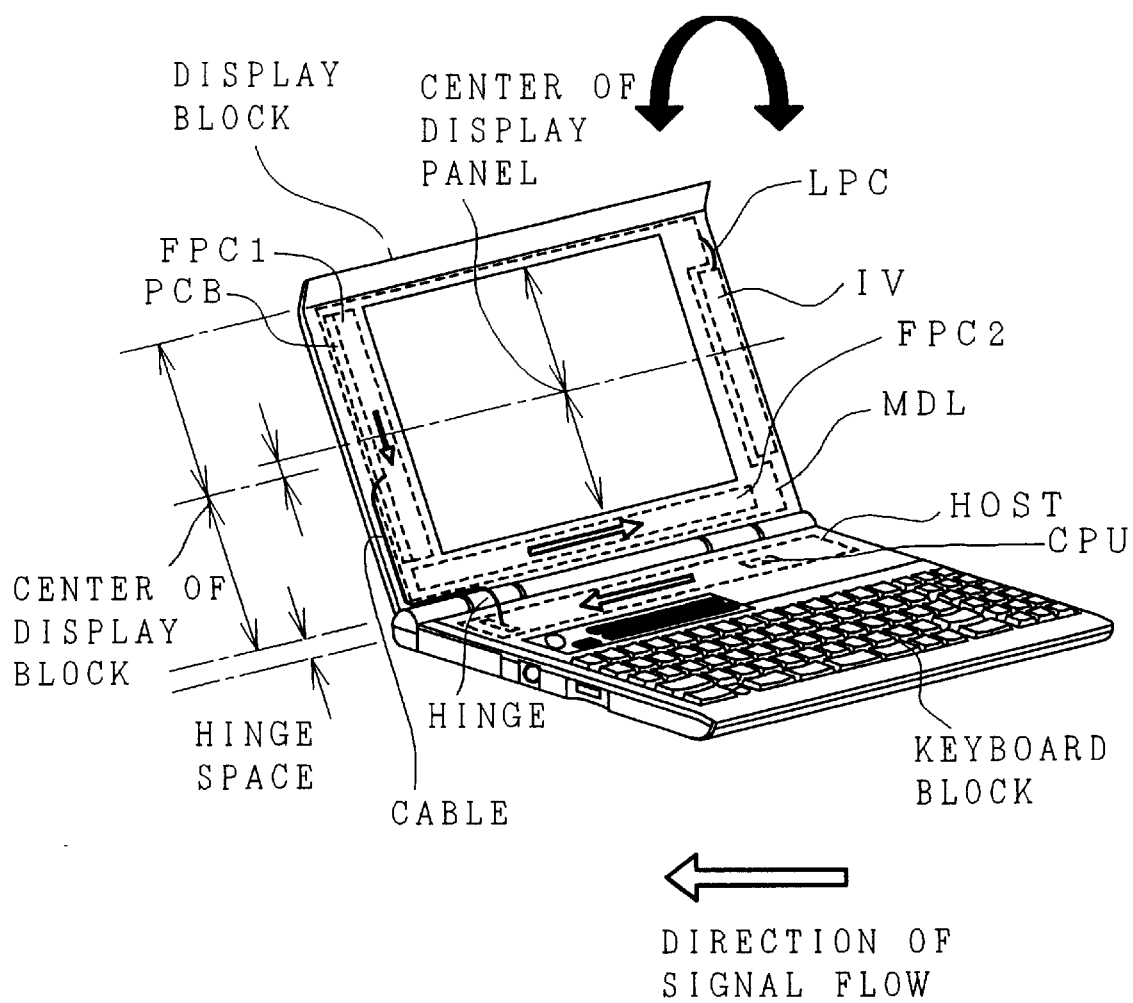
FIG. 25 is a perspective view showing the appearance of a personal computer which is a data processor mounted with the liquid crystal display device of the present invention.

FIG. 25 is a diagram showing the appearance of a personal computer for explaining a data processor employing the liquid crystal display device, wherein symbol IV denotes an inverter power source for driving a fluorescent tube, and CPU denotes a central processing unit on the host side.

By adopting a design of the housing, polarizer plates and black matrix according to the present invention, it is possible to greatly reduce the external size compared with that of the prior art.

The embodiment of the present invention has been described above by way of examples.

It should, however, be noted that the invention is in no way limited to the above-mentioned examples only but can be modified in a variety of other ways without departing from the gist and scope of the invention.

In the above-mentioned examples, for instance, the thin-film amorphous silicon transistor TFT is used as an active element. It is, however, also possible to use a thin-film polysilicon transistor, a MOS transistor on the silicon wafer, or a two-terminal element such as an MIM (metal-intrinsic-metal) diode.

The invention can be further adapted to a reflection-type liquid crystal display device constituted by a pair of substrates at least one of which is transparent, a reflection means and a polarizer means.

According to the present invention, in the liquid crystal display device, particularly in the active matrix-type color liquid crystal display device of the in-plane field type operating in a normally black mode, the frame size is decreased, and the leakage of backlight that occurs in the regions from the ends of the image display region to the housing is effectively prevented.

Moreover, the sheet resistivities of the transparent conductive layer and of the conductive spacer over the transparent substrate of the viewed side are specifically determined, and the transparent conductive layer is electrically connected to the housing to prevent a defective image caused by static electricity specific to the in-plane field-type liquid crystal display device.

We claim:

1. A liquid crystal display device comprising a switching element, a pixel electrode and a counter electrode formed in a unit pixel over a first substrate of two substrates which are so disposed as to be opposed to each other with a liquid crystal layer provided therebetween, at least one of the two substrates being transparent, an electric field being generated between said pixel electrode and said counter electrode substantially in parallel with the first substrate for modulating light passing through the liquid crystal layer, wherein a black matrix having a resistivity not smaller than $10^6$ $\Omega \cdot cm$ is formed between the two substrates, and an electrically conductive layer having a light-transmitting property formed over a surface of the at least one transparent substrate at a viewed side thereof which is opposite to the liquid crystal layer side of the at least one transparent substrate, and is formed over a pixel-forming region;

wherein both of the two substrates are transparent, a backlight unit is disposed under the first substrate, and the substrate at the viewed side is a second substrate of the two substrates;

wherein the electrically conductive layer has a sheet resistivity no greater than $2 \times 10^{14}$ $\Omega/\square$; and wherein the electrically conductive layer is formed by dispersing electrically conductive particles in a material for bonding a polarizer plate to said second transparent substrate.

2. A liquid crystal display device according to claim 1, wherein the electrically conductive particles are carbon particles.

3. A liquid crystal display device according to claim 1, wherein the electrically conductive particles are particles containing any one of ITO, $SnO_2$ or $In_2O_3$, or a mixture thereof.

4. A liquid crystal display device comprising a switching element, a pixel electrode and a counter electrode formed in a unit pixel over a first substrate of two substrates which are so disposed as to be opposed to each other with a liquid crystal layer provided therebetween, at least one of the two substrates being transparent, an electric field being generated between said pixel electrode and said counter electrode substantially in parallel with the first substrate for modulating light passing through the liquid crystal layer, wherein a black matrix having a resistivity not smaller than $10^6$ $\Omega \cdot cm$ is formed between the two substrates, and an electrically conductive layer having a light-transmitting property formed over a surface of the at least one transparent substrate at a viewed side thereof which is opposite to the liquid crystal layer side of the at least one transparent substrate, and is formed over a pixel-forming region;

wherein both of the two substrates are transparent, a backlight unit is disposed under the first substrate, and the substrate at the viewed side is a second substrate of the two substrates;

wherein the electrically conductive layer has a sheet resistivity no greater than $2 \times 10^{14}$ $\Omega/\square$; and wherein the electrically conductive layer is an electrically conductive sheet interposed between the second transparent substrate and a polarizer plate.

5. A liquid crystal display device comprising a switching element, a pixel electrode and a counter electrode formed in a unit pixel over a first substrate of two substrates which are so disposed as to be opposed to each other with a liquid crystal layer provided therebetween, at least one of the two substrates being transparent, an electric field being generated between said pixel electrode and said counter electrode substantially in parallel with the first substrate for modulating light passing through the liquid crystal layer, wherein a black matrix having a resistivity not smaller than $10^6$ $\Omega \cdot cm$ is formed between the two substrates, and an electrically conductive layer having a light-transmitting property formed over a surface of the at least one transparent substrate at a viewed side thereof which is opposite to the liquid crystal layer side of the at least one transparent substrate, and is formed over a pixel-forming region;

wherein both of the two substrates are transparent, a backlight unit is disposed under the first substrate, and the substrate at the viewed side is a second substrate of the two substrates;

wherein the electrically conductive layer has a sheet resistivity no greater than $2 \times 10^{14}$ $\Omega/\square$; and wherein the electrically conductive layer is a transparent electrically conductive film interposed between the second transparent substrate and a polarizer plate.

6. A liquid crystal display device comprising a switching element, a pixel electrode and a counter electrode formed in a unit pixel over a first substrate of two substrates which are so disposed as to be opposed to each other with a liquid crystal layer provided therebetween, at least one of the two substrates being transparent, an electric field being generated between said pixel electrode and said counter electrode substantially in parallel with the first substrate for modulating light passing through the liquid crystal layer, wherein a black matrix having a resistivity not smaller than $10^6$ $\Omega \cdot cm$ is formed between the two substrates, and an electrically conductive layer having a light-transmitting property formed over a surface of the at least one transparent substrate at a viewed side thereof which is opposite to the liquid crystal layer side of the at least one transparent substrate, and is formed over a pixel-forming region; and wherein said liquid crystal display device further comprises an electrically conductive housing having an opening for exposing a display area, and said electrically conductive layer is connected to said housing via an electrically conductive material having a sheet resistivity no greater than $2\times10^8$ Ω/□.

7. A liquid crystal display device according to claim 6, wherein the electrically conductive material is an electrically conductive rubber.

8. A liquid crystal display device according to claim 6, wherein the electrically conductive material is a silver paste.

9. A liquid crystal display device according to claim 6, wherein the electrically conductive material is a metal foil tape.

10. A liquid crystal display device according to claim 6, wherein the electrically conductive material is an organic material containing at least one of electrically conductive beads and electrically conductive fibers.

11. A liquid crystal display device comprising a switching element, a pixel electrode and a counter electrode formed in a unit pixel over a first substrate of two substrates which are so disposed as to be opposed to each other with a liquid crystal layer provided therebetween, and further comprising a backlight unit located under said first substrate, and an electrically conductive housing having an open region including a display area, electric field being generated between said pixel electrode and said counter electrode substantially in parallel with the first substrate for modulating light passing through the liquid crystal layer, wherein a black matrix made of a resin composition having a resistivity of not smaller than $10^6$ Ω·cm is formed between a second substrate of the two substrates and the liquid crystal layer, an electrically conductive layer having a light-transmitting property is formed over a pixel-forming region and over a surface of the second substrate on a side thereof opposite to the liquid crystal layer, and a polarizer plate is disposed over said second substrate side, which polarizer plate is larger than the open region of the electrically conductive housing.

12. A liquid crystal display device comprising a switching element, a pixel electrode and a counter electrode formed in a unit pixel on a first substrate of two substrates which are so disposed as to be opposed to each other with a liquid crystal layer provided therebetween, and further comprising a backlight unit provided under said first substrate, and an electrically conductive housing having an open region including a display area, an electric field being generated between said pixel electrode and said counter electrode substantially in parallel with the first substrate for modulating light passing through the liquid crystal layer, wherein a black matrix made of a resin composition having a resistivity of not smaller than $10^6$ Ω·cm is formed between a second substrate of the two substrates and the liquid crystal layer, an electrically conductive layer having a light-transmitting property is formed over a pixel-forming region and over a surface of the second substrate on a side thereof opposite to the liquid crystal layer, a polarizer plate is disposed over said second substrate, which polarizer plate is smaller than the open region of the electrically conductive housing, and a light-shielding spacer is so formed as to cover a gap between said polarizer plate and the open region of the housing and so as to be overlapped on the polarizer plate and the housing.

13. A liquid crystal display device according to claim 11 or 12, wherein said substrates are transparent are connected by a sealing member, and at least part of the outer circumference of said black matrix is formed inside the region where the sealing member is formed.

14. A liquid crystal display device according to claim 11, wherein the width of an overlap of said polarizer plate on the housing is at least 0.5 mm.

15. A liquid crystal display device according to claim 11, wherein the ends of said polarizer plate are spaced inwardly from the ends said second substrate by more than 0.5 mm.

16. A liquid crystal display device according to claim 11 or 12, wherein said polarizer plate has a sheet resistivity no greater than $2\times10^{14}$ Ω/□, and said polarizer plate is electrically connected to the housing.

17. A liquid crystal display device according to claim 11 or 12, wherein an electrically conductive transparent layer having a sheet resistivity no greater than $2\times10^{14}$ Ω/□ is formed on the upper side of said polarizer plate, is electrically connected to the housing.

18. A liquid crystal display device according to claim 11 or 12, wherein a electrically conductive transparent film having a sheet resistivity no greater than $2\times10^{14}$ Ω/□ is formed between said polarizer plate and said transparent substrate, and said electrically conductive transparent film is electrically connected to the housing.

19. A liquid crystal display device according to claim 16, wherein said polarizer plate is connected to the housing via an electrically conductive material having a resistance no greater than $1 \times 10^3$ Ω.

20. A liquid crystal display device according to claim 11 or 12, wherein an electrically conductive film is connected to the housing via an electrically conductive material having a resistance no greater than $1\times10^3$ Ω.

21. A liquid crystal display device according to any one of claim 11 or 12, wherein polarizer plates are provided on both substrates, the axis of polarization of the polarizer plates being deviated by about 90 degrees relative to each other.

22. A liquid crystal display device according to claim 11, wherein said light-shielding spacer is made of an electrically conductive material having a sheet resistivity no greater than $1 \times 10^8$ Ω/□.

23. A liquid crystal display device comprising a liquid crystal display panel and a backlight unit, the liquid crystal display panel further comprising a pixel electrode and a counter electrode formed in a unit pixel between two transparent substrates which are arranged so as to be opposed to each other with the liquid crystal layer provided therebetween, an electric field being generated between the pixel electrode and the counter electrode substantially in parallel with the first substrate for modulating light passing through the liquid crystal layer, wherein a transparent protective plate is further arranged on one transparent substrate at a viewed side thereof with a gap formed therebetween; and wherein the liquid crystal display panel and the backlight unit are contained in an electrically conductive housing, and the protective plate is supported by the housing.

24. A liquid crystal display device comprising a liquid crystal display panel and a backlight unit, the liquid crystal display panel further comprising a pixel electrode and a counter electrode formed in a unit pixel between two transparent substrates which are arranged so as to be opposed to each other with the liquid crystal layer provided therebetween, an electric field being generated between the pixel electrode and the counter electrode substantially in parallel with the first substrate for modulating light passing through the liquid crystal layer, wherein a transparent protective plate is further arranged on one transparent substrate at a viewed side thereof with a gap formed therebetween;

wherein said conductive plate is provided with an electrically conductive film;

wherein said electrically conductive film is a grounded film; and wherein the liquid crystal display panel and the backlight unit are contained in an electrically conductive housing, the protective plate is supported by the housing, and the electrically conductive film is connected to the housing.

25. A liquid crystal display device comprising a switching element, a pixel electrode and a counter electrode formed in a unit pixel over a first substrate of two substrates which are so disposed as to be opposed to each other with a liquid crystal layer provided therebetween, at least one of the two substrates being transparent, an electric field being generated between said pixel electrode and said counter electrode substantially in parallel with the first substrate for modulating light passing through the liquid crystal layer, wherein an electrically conductive layer having a light transmitting property is formed over a surface of the at least one transparent substrate at a viewed side thereof which is opposite to the liquid crystal layer side of the at least one transparent substrate, and is formed over a pixel-forming region.

26. A liquid crystal display device according to claim 25, wherein both of the two substrates are transparent, a backlight unit is disposed under the first substrate, and the substrate of the viewed side is a second substrate of the two substrates.

27. A liquid crystal display device according to claim 25, wherein the electrically conductive layer has a light transmission factor of at least 34%.

28. A liquid crystal display device according to claim 25, wherein the electrically conductive layer has a sheet resistivity no greater than $2 \times 10^{14}$ $\Omega/\square$.

29. A liquid crystal display device according to claim 28, wherein the electrically conductive layer is formed by dispersing electrically conductive particles in a material for bonding a polarizer plate to a second transparent substrate of the two substrates.

30. A liquid crystal display device according to claim 29, wherein the electrically conductive particles are carbon particles.

31. A liquid crystal display device according to claim 29, wherein the electrically conductive particles are particles containing any one of ITO, $SnO_2$ or $In_2O_3$, or a mixture thereof.

32. A liquid crystal display device according to claim 25, wherein the electrically conductive layer is an electrically conductive sheet interposed between a second transparent substrate of the two substrates and a polarizer plate.

33. A liquid crystal display device according to claim 25, wherein said electrically conductive layer is a transparent electrically conductive film interposed between a second transparent substrate of the two substrates and a polarizer plate.

34. A liquid crystal display device according to claim 25, wherein the electrically conductive layer is a transparent electrically conductive film formed on a surface of a polarizer plate.

35. A liquid crystal display device according to claim 25, wherein the electrically conductive layer is a transparent electrically conductive film formed inside a polarizer plate.

36. A liquid crystal display device according to any one of claims 33, 34 and 35, wherein the transparent electrically conductive film is a film containing as a chief component, any one of ITO, $SnO_2$ or $In_2O_3$.

37. A liquid crystal display device according to claim 35, wherein the electrically conductive layer is a grounded layer.

38. A liquid crystal display device having a plurality of switching elements comprising:

a pair of substrates in which at least one of the pair of substrates is transparent;

a liquid crystal layer interposed between said pair of substrates; and an electrode structure formed on one of said pair of substrates for generating an electric field having a major component substantially in parallel with said one of said pair of substrates;

wherein an electrically conductive layer having a light transmitting property is formed over a surface of the at least one transparent substrate at a viewed side thereof which is opposite to the liquid crystal layer side of the at least one transparent substrate and is formed over a pixel-forming region.

39. A liquid crystal display device having a plurality of switching elements comprising:

a pair of substrates in which at least one of the pair of substrates is transparent;

a liquid crystal layer interposed between said pair of substrates; and an electrode structure formed on one of said pair of substrates for generating an electric field having a major component substantially in parallel with said one of said pair of substrates;

wherein an electrically conductive layer having a light transmitting property is formed over a surface of the at least one transparent substrate at a viewed side thereof which is opposite to the liquid crystal layer side of the at least one transparent substrate and is formed over a pixel-forming region so as to enable proper image display by said liquid crystal display device.

40. A liquid crystal display device having a plurality of switching elements comprising:

a pair of substrates;

a liquid crystal layer interposed between said pair of substrates; and an electrode structure formed on one of said pair of substrates for generating an electric field having a major component substantially in parallel with said one of said pair of substrates, the generation of the electric field substantially in parallel with said one of said pair of substrates being disturbed by static electricity externally applied to the liquid crystal display device, wherein an electrically conductive layer having a light transmitting property is formed over a surface of the other of said pair of substrates at a viewed side thereof which is opposite to the liquid crystal layer side of said one of said pair of substrates, and is formed over a pixel-forming region so as to substantially prevent disturbance of the generation of the electric field substantially in parallel with said one of said pair of substrates by externally applied static electricity.

41. A liquid crystal display device having a plurality of switching elements comprising:

a pair of substrates;

a liquid crystal layer interposed between said pair of substrates; and an electrode structure formed on one of said pair of substrates for generating an electric field having a major component substantially in parallel with said one of said pair of substrates;

wherein a viewed surface of a screen of the liquid crystal display device becomes distorted when the screen is rubbed in at least one status of the screen, an electrically conductive layer having a light transmitting property being formed over a surface of the other of said pair of substrates at a viewed side thereof which is opposite to the liquid crystal layer side of said one of said pair of substrates, and is formed over a pixel-forming region so as to substantially prevent the viewed surface of the screen of the liquid crystal display device from becoming distorted when rubbed, and thereby enabling proper image display.

42. A liquid crystal layer device according to claim 41, wherein the distortion of the screen is that the screen becomes whitish in regions where the screen is rubbed.

43. A liquid crystal layer device according to claim 42, wherein the at least one status of the screen includes a black status.

44. A liquid crystal display device having a plurality of switching elements comprising:
   a pair of substrates;
   a liquid crystal layer interposed between said pair of substrates;
   an electrode structure formed on one of said pair of substrates for generating an electric field having a major component substantially in parallel with said one of said pair of substrates; and
   a transparent electrically conductive layer formed on another of said pair of substrates at a viewed side which is opposite to the liquid crystal side;
   wherein a distance between said electrode structure and said electrically conductive layer is at least ten times larger than the distance between electrodes of said electrode structure.

45. A liquid crystal display device according to claim 44, wherein said electrode structure includes a pixel electrode and a counter electrode.

46. A liquid crystal display device according to claim 45, wherein the distance between said pixel electrode and said counter electrode is in a range of several microns to several tens of microns.

47. A liquid crystal display device according to claim 45, wherein the thickness of said another of said pair of substrates is about one millimeter.

48. A liquid crystal display device according to claim 44, wherein said electrically conductive layer includes particles containing any one of ITO, $SnO_2$, $In_2O_3$ and a mixture thereof.

49. A liquid crystal display device having a plurality of switching elements comprising:
   a pair of substrates;
   a liquid crystal layer interposed between said pair of substrates; and
   an electrode structure formed on one of said pair of substrates for generating an electric field having a major component substantially in parallel with said one of said pair of substrates;
   wherein an ITO film is formed as a transparent electrically conductive film on another of said pair of substrates at a viewed side which is opposite to the liquid crystal layer side.

50. A liquid crystal display device according to claim 49, wherein said electrode structure includes a pixel electrode and a counter electrode.

51. A liquid crystal display device according to claim 49, wherein said transparent electrically conductive film is a sputtered film.

52. A liquid crystal display device according to claim 49, wherein said liquid crystal layer has a thickness larger than 2.8 $\mu$m and smaller than 4.5 $\mu$m.

53. A liquid crystal display device according to claim 52, wherein said electrode structure includes a pixel electrode a counter electrode.

54. A liquid crystal display device according to claim 52, wherein said transparent electrically conductive film is a sputtered film.

55. A liquid crystal display device having a plurality of switching elements comprising:
   a pair of substrates;
   a liquid crystal layer interposed between said pair of substrates;
   an electrode structure formed on one of said pair of substrates for generating an electric field having a major component substantially in parallel with said one of said pair of substrates; and
   a polarizer plate disposed above another of said pair of substrates;
   wherein said polarizer plate is coated with a transparent electrically conductive layer formed at a viewed side of said polarizer plate which is opposite to the liquid crystal layer side.

56. A liquid crystal display device according to claim 55, wherein said transparent electrically conductive layer include particles containing any one of ITO, $SnO_2$, $In_2O_3$ and a mixture thereof.

57. A liquid crystal display device according to claim 56, wherein said transparent electrically conductive layer is an ITO layer having a resistivity smaller than $2 \times 10^{14}$ $\Omega/\square$.

58. A liquid crystal display device having a plurality of switching elements comprising:
   a pair of substrates;
   a liquid crystal layer interposed between said pair of substrates;
   an electrode structure formed on one of said pair of substrates for generating an electric field having a major component substantially in parallel with said one of said pair of substrates; and
   a polarizer plate disposed above another of said pair of substrates;
   wherein said polarizer plate includes an ITO layer as an electrically conductive layer.

59. A liquid crystal display device according to claim 58, wherein said transparent electrically conductive layer include particles containing any one of ITO, $SnO_2$, $In_2O_3$ and a mixture thereof.

60. A liquid crystal display device according to claim 59, wherein said ITO layer has a resistivity smaller than $2 \times 10^{14}$ $\Omega/\square$.

61. A liquid crystal display device having a plurality of switching elements comprising:
   a pair of substrates;
   a liquid crystal layer interposed between said pair of substrates;
   an electrode structure formed on one of said pair of substrates for generating an electric field having a major component substantially in parallel with said one of said pair of substrates;
   an electrically conductive layer formed on another of said pair of substrates at a viewed side which is opposite to the liquid crystal layer; and polarizer plates provided on both of said pair of substrates;

wherein rubbing directions for said substrates extend in parallel between said pair of substrates, and axes of polarization of said polarizer plates are deviated by about 90 degrees relative to each other.

62. A liquid crystal display device according to claim 61, wherein one of said rubbing directions extends in parallel with an axis of polarization of one of said polarizer plates.

63. A liquid crystal display device according to claim 62, wherein said liquid crystal display device has a birefringence mode.

64. A liquid crystal display device according to claim 61, wherein said liquid crystal display device has a display mode of a normally-black mode.

* * * * *